(12) United States Patent
Chiu et al.

(10) Patent No.: US 11,212,523 B2
(45) Date of Patent: Dec. 28, 2021

(54) VIDEO PROCESSING METHODS AND APPARATUSES OF MERGE NUMBER SIGNALING IN VIDEO CODING SYSTEMS

(71) Applicant: MEDIATEK INC., Hsinchu (TW)

(72) Inventors: Chih-Yao Chiu, Hsinchu (TW); Chun-Chia Chen, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/145,568

(22) Filed: Jan. 11, 2021

(65) Prior Publication Data

US 2021/0227206 A1 Jul. 22, 2021

Related U.S. Application Data

(60) Provisional application No. 62/961,301, filed on Jan. 15, 2020, provisional application No. 62/960,089, filed on Jan. 12, 2020.

(51) Int. Cl.
*H04N 19/105* (2014.01)
*H04N 19/51* (2014.01)

(52) U.S. Cl.
CPC ........... *H04N 19/105* (2014.11); *H04N 19/51* (2014.11)

(58) Field of Classification Search
CPC .............................. H04N 19/105; H04N 19/51
See application file for complete search history.

(56) References Cited

U.S. PATENT DOCUMENTS

| | | | | |
|---|---|---|---|---|
| 2020/0267406 A1* | 8/2020 | Chang | .................. | H04N 19/513 |
| 2021/0029356 A1* | 1/2021 | Zhang | .................. | H04N 19/119 |
| 2021/0168409 A1* | 6/2021 | Furht | .................... | H04N 19/70 |
| 2021/0227212 A1* | 7/2021 | Lee | ...................... | H04N 19/132 |

FOREIGN PATENT DOCUMENTS

| | | | | | |
|---|---|---|---|---|---|
| GB | 2590634 | * | 7/2021 | ............ | H04N 19/70 |
| WO | WO-2020096428 A1 | * | 5/2020 | ........... | H04N 19/176 |
| WO | WO-2020139037 A1 | * | 7/2020 | ........... | H04N 19/436 |
| WO | WO-2020181542 A1 | * | 9/2020 | ........... | H04N 19/577 |

* cited by examiner

*Primary Examiner* — Anner N Holder
(74) *Attorney, Agent, or Firm* — McClure, Qualey & Rodack, LLP

(57) ABSTRACT

Video processing methods and apparatuses include receiving input video data, determining a Merge number for a regular Merge mode, comparing the Merge number for the regular Merge mode with a predefined value, and only signaling or parsing a difference between the Merge number for the regular Merge mode and a Merge number for a Geometric Partition Mode (GPM) Merge mode when the Merge number for the regular Merge mode is larger than or equal to the predefined value. The difference between the Merge numbers is inferred to 0 when the difference is not signaled. The Merge number for the GPM Merge mode defines a size of a GPM Merge candidate list constructed for each block coded or to be coded by the GPM Merge mode.

20 Claims, 8 Drawing Sheets

| Merge Index | L0MV | L1MV |
|---|---|---|
| 0 | x | |
| 1 | | x |
| 2 | x | |
| 3 | | x |
| 4 | x | |
| | | |
| | | |
| | | |

VIDEO PROCESSING METHODS AND APPARATUSES OF MERGE NUMBER SIGNALING IN VIDEO CODING SYSTEMS

CROSS REFERENCE TO RELATED APPLICATION

The present invention claims priority to U.S. Provisional Patent Application, Ser. No. 62/960,089, filed on Jan. 12, 2020, entitled "A new method about merge number signalling", and U.S. Provisional Patent Application, Ser. No. 62/961,301, filed on Jan. 15, 2020, entitled "A new method about merge number signalling". The U.S. Provisional patent applications are hereby incorporated by reference in their entireties.

FIELD OF THE INVENTION

The present invention relates to video processing methods and apparatuses in video encoding and decoding systems. In particular, the present invention relates to Merge number signaling for Merge modes.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in the HEVC standard. A raster scan order is used to encode or decode CTUs in each slice. Each CTU may contain one Coding Unit (CU) or recursively split into four smaller CUs according to a quad-tree partitioning structure until a predefined minimum CU size is reached. The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation in inter picture prediction identifies one (uni-prediction) or two (bi-prediction) best reference blocks for a current block in one or two reference pictures, and motion compensation in inter picture prediction locates the one or two best reference blocks according to one or two Motion Vectors (MVs). A difference between the current block and a corresponding predictor is called prediction residual. The corresponding predictor is the best reference block when uni-prediction is used. When bi-prediction is used, the two reference blocks are combined to form the predictor.

Skip and Merge Mode

Skip and Merge modes were proposed and adopted in the HEVC standard to increase the coding efficiency of motion information by inheriting motion information from one of spatially neighboring blocks or a temporal collocated block. To code a PU in the Skip or Merge mode, instead of signaling motion information, only an index representing a final candidate selected from a candidate set is signaled. The motion information reused by the PU coded in the Skip or Merge mode includes a MV, an inter prediction indicator, and a reference picture index of the selected final candidate. It is noted that if the selected final candidate is a temporal motion candidate, the reference picture index is always set to zero. Prediction residual are coded when the PU is coded in the Merge mode, however, the Skip mode further skips signaling of the prediction residual as the residual data of a PU coded in the Skip mode is forced to be zero.

In the upcoming emerging video coding standard Versatile Video Coding (VVC), a Merge candidate list for VVC regular Merge mode is constructed by including the following five types of candidates in order: spatial candidates from spatial neighboring CUs, temporal candidates from collocated CUs, history-based candidates from a First In First Out (FIFO) table, pairwise average candidates, and zero MVs. The size of the Merge candidate list is signaled in a slice header and a maximum allowed size of the Merge candidate list is 6. For each CU coded in a Merge mode, an index of the best Merge candidate is encoded using Truncated Unary (TU) binarization. The first bin of the Merge index is coded with context and bypass coding is used for other bins. A maximum of four spatial candidates is selected among candidates located in the positions depicted in FIG. 1, and the order of derivation is a top position $B_0$ 114, a left position $A_0$ 112, a right above position $B_1$ 113, a left below position $A_1$ 111, and a left above position $B_2$ 115. The candidate at the left above position $B_2$ is only included in the Merge candidate list when one or more spatial candidates are unavailable. A spatial candidate is unavailable because it belongs to another slice or tile or because it is intra coded. After the candidate at the left below position $A_1$ 111 is added to the Merge candidate list, the addition of the remaining candidates is subject to a redundancy check which ensures that candidates with same motion information are excluded from the Merge candidate list so that coding efficiency can be improved. To reduce computational complexity, not all possible candidate pairs are considered in the mentioned redundancy check. Only the pairs linked with an arrow in FIG. 2 are compared for redundancy check and a candidate is only added to the Merge candidate list if the checked candidate has different motion information from the previous candidate.

Only one temporal candidate is added to the Merge candidate list. The position of the temporal candidate is selected between positions $T_{BR}$ 121 and $T_{CTR}$ 122 as shown in FIG. 1. The candidate at position $T_{BR}$ 121 is inserted in the Merge candidate list as the temporal candidate, and if the CU at position $T_{BR}$ 121 is not available, is intra coded, or is outside of the current row of CTUs, the candidate at position $T_{CTR}$ 122 is inserted in the Merge candidate list. In the derivation process of the temporal candidate, a scaled MV is derived based on a collocated CU belonging to a collocated reference picture. The reference picture list to be used for derivation of the collocated CU is explicitly signaled in the slice header. The scaled MV for the temporal candidate is obtained as illustrated by the dotted line in FIG. 3, which is scaled from the MV of the collocated CU using Picture Order Count (POC) distances, tb and td, where tb is defined to be the POC difference between the reference picture of the current picture (curr_ref) and the current picture (curr_pic), and td is defined to be the POC difference between the reference picture of the collocated picture (col_ref) and the collocated picture (col_pic). The reference picture index of the temporal candidate is set equal to zero.

History-Based Merge Candidate Derivation

The History-based Motion Vector Predictor (HMVP) candidates are added to the Merge candidate list after inserting the spatial and temporal candidates. Motion information of a previously coded block is stored in a table and used as MVP for the current CU. The table with multiple HMVP candidates is maintained during the encoding or decoding process. The table is emptied when a new CTU row is encountered. Whenever there is a non-subblock inter-coded CU, associated motion information is added to the last entry of the table as a new HMVP candidate. The HMVP table size S is set to be 6, which indicates up to 6 HMVP candidates may be added to the table. When inserting a new motion candidate to the table, a constrained FIFO rule is applied. Redundancy check is first performed to find whether there is an identical HMVP in the table. The identical HMVP is removed from the table and all the HMVP candidates afterwards are moved forward. HMVP candidates in the HMVP table can be used in the Merge candidate list construction process. The latest several HMVP candidates in the HMVP table are checked in order and inserted to the Merge candidate list after the temporal candidate. Redundancy check is performed on the HMVP candidates by comparing with the spatial or temporal candidate. The number of HMVP candidates used for Merge candidate list generation is set as $(N<=4)?M:(8-N)$, where N indicates the number of existing candidates in the Merge candidate list and M indicates the number of available HMVP candidates in the HMVP table. Once the total number of available Merge candidate reaches the maximally allowed Merge candidates minus 1, the Merge candidate list construction process from the HMVP table is terminated.

Pairwise Average Merge Candidates Derivation

Pairwise average candidates are generated by averaging predefined pairs of candidates in the existing Merge candidate list, and the predefined pairs are defined as {(0,1), (0,2), (1,2), (0,3), (1,3), (2,3)}, where the numbers denote the Merge indices in the Merge candidate list. The average MVs are calculated separately for each reference list. If both MVs are available in one list, the average MV is generated by averaging these two MVs even when the two MVs are pointing to different reference pictures; if only one MV is available in this list, the average MV is generated by directly using this available MV directly; if none of the MVs is available, this list is invalid. When the Merge candidate list is not full after pairwise average candidates are added, zero MVs are inserted until the Merge number of the Merge candidate list is encountered.

Triangle Partition Mode Merge

A Triangle Partition Mode (TPM) was proposed to improve inter prediction for CUs larger than or equal to 8×8. A CU-level flag is signaled to select one of the following modes including regular Merge mode, Merge mode with Motion Vector Difference (MMVD), Combined Intra/Inter Prediction (CIIP) mode, TPM, and subblock Merge mode. A CU coded or to be coded in TPM is split evenly into two triangle-shaped partitions by either a diagonal split or anti-diagonal split. Each triangle partition in the CU is inter-predicted using its own motion information. Each triangle partition is constrained to be predicted by uni-prediction to ensure that no more than two motion compensated predictions are needed for each CU, which is aligned with the conventional bi-prediction. For a CU coded or to be coded in TPM, a flag indicating the splitting direction and two Merge indices are signaled. The Merge number for constructing the TPM candidate list is signaled explicitly at a slice level and the TPM Merge indices are coded using binarization for each TPM CU. After predicting each triangle partition, sample values along the diagonal or anti-diagonal edge are adjusted using a blending processing with adaptive weights. The resulting prediction signal of the whole CU is processed by transform and quantization processes. The motion field of a CU predicted using TPM is stored. The triangle partition mode is not used in combination with SubBlock Transform (SBT), that is, a SBT flag cu_sbt_flag for a CU is inferred to be 0 without signaling when the CU-level flag indicates the CU is coded in TPM. The uni-prediction candidate list for a triangle partition is derived directly from the Merge candidate list constructed according to the extended Merge prediction process. Denote n is the index of the uni-prediction motion in the triangle uni-prediction candidate list. The LX motion vector of the n-th extended Merge candidate, with X equal to the parity of n, is used as the n-th uni-prediction motion vector for TPM. These motion vectors are marked with "x" in FIG. 4. In case a corresponding LX motion vector of the n-th extended Merge candidate does not exist, the L(1-X) motion vector of the same candidate is used instead as the uni-prediction motion vector for TPM.

For a CU coded in TPM, blending is applied to two prediction signals to derive boundary samples at the diagonal or anti-diagonal edge between the two triangle partitions after predicting each triangle partition using its own motion information. FIG. 5A and FIG. 5B illustrate weight maps used in the blending process applied to boundary samples at the diagonal edge between two triangle partitions for luma and chroma samples respectively. The final predictor for each boundary sample is derived from a weighted sum of a first predictor $P_1$ for the first triangular prediction unit and a second predictor $P_2$ for the second triangular prediction unit. As shown in FIGS. 5A and 5B, the weighting factors corresponding to the first and second predictors $P_1$ and $P_2$ for samples marked with 1 are 1/8 and 7/8 respectively, and the weighting factors corresponding to $P_1$ and $P_2$ for samples marked with 2 are 2/8 and 6/8 respectively. The final predictor for each sample marked with 1 is $1/8*P_1+7/8*P_2$, and the final predictor for each sample marked with 2 is $2/8*P_1+6/8*P_2$. Samples marked with 4 are located in the middle of the diagonal edge so the weighting factors for $P_1$ and $P_2$ are both 4/8, which is equivalent to applying equal weighting to the two predictors $P_1$ and $P_2$. The final predictor for each sample marked with 4 is therefore $4/8*P_1+4/8*P_2$. Similarly, the weighting factors for samples marked with 6 are 6/8 and 2/8 and the weighting factors for samples marked with 7 are 7/8 and 1/8, so the final predictor for each sample marked with 6 is $6/8*P_1+2/8+P_2$ and the final predictor for each sample marked with 7 is $7/8*P_1+1/8*P_2$.

Motion vectors for motion field storage in TPM are generated by combining Mv1 and Mv2 to form a bi-prediction motion vector if Mv1 and Mv2 are from different reference picture lists. In cases when Mv1 and Mv2 are from the same reference picture list, only uni-prediction motion vector Mv2 is stored.

Affine Motion Compensation Prediction

In the development of the VVC standard, block-based affine transform motion compensation prediction is an alternative inter prediction coding tool to the traditional translation motion compensation prediction. The affine motion field of a block is described by motion information of two control points in a 4-parameter affine motion model or three control points in a 6-parameter affine motion model. For the 4-parameter affine motion model, a motion vector at a sample location (x,y) in a block is derived by the following equation.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases}$$

For the 6-parameter affine motion model, a motion vector at a sample location (x,y) in a block is derived by the following equation.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

where ($mv_{0x}$, $mv_{0y}$) is the motion vector of the top-left corner control point, ($mv_{1x}$, $mv_{1y}$) is the motion vector of the top-right corner control point, and ($mv_{2x}$, $mv_{2y}$) is the motion vector of the bottom-left corner control point.

FIG. 6 illustrates an example of affine motion vector field for each 4×4 subblock in a CU coded by affine motion compensation prediction. To derive a motion vector of each 4×4 luma subblock in an affined coded CU, the motion vector of the center sample of each subblock is calculated according to Equation (1) or (2) and rounded to 1/16 fraction accuracy. Motion compensation interpolation filters are applied to generate the prediction signal of each subblock with the derived motion vector. The subblock size of chroma components is also set to be 4×4. The MV of a 4×4 chroma subblock is calculated as the average of the MVs of the four corresponding 4×4 luma subblocks.

There are two affine motion inter prediction modes including affine Merge mode and affine Advance Motion Vector Prediction (AMVP) mode. Affine Merge mode can be applied to CUs with both width and height larger than or equal to 8. In this mode, the control point MVs of a current CU is generated based on motion information of spatial neighboring CUs. There can be up to five control point Motion Vector Predictor (MVP) candidates and an index is signaled to indicate the one to be used for the current CU. Three types of control point MV candidates are used to form an affine Merge candidate list, including inherited affine Merge candidates that extrapolated from the control point MVs of neighboring CUs, constructed affine Merge candidates Control Point MVPs (CPMVPs) that are derived using translational MVs of neighboring CUs, and zero MVs.

In the development of the VVC standard, there are a maximum of two inherited affine candidates, which are derived from the affine motion model of neighboring blocks, one from left neighboring CUs and one from above neighboring CUs. The scan order of candidate positions for the left predictor is A0 112 then A1 111 as shown in FIG. 1. The scan order of candidate positions for the above predictor is B0 114, B1 113, followed by B2 115 as shown in FIG. 1. Only the first inherited candidate from each side is selected. The two inherited candidates will not be checked for redundancy. In cases when a neighboring affine CU is identified, its control point motion vectors are used to derive the CPMVP candidate in the affine Merge list of the current CU. FIG. 7 illustrates control point motion vector inheritance, and as shown in FIG. 7, when the neighboring left bottom block A is coded in affine mode, motion vectors $v_2$, $v_3$, and $v_4$ of the top left corner, above right corner, and left bottom corner of the CU which contains the block A are attained. When the CU containing the block A is coded with the 4-parameter affine model, the two control point MVs of the CU are calculated according to motion vectors $v_2$ and $v_3$. When the CU containing the block A is coded with the 6-parameter affine model, the three control point MVs of the CU are calculated according to motion vectors $v_2$, $v_3$, and $v_4$.

Constructed affine candidate is constructed by combining the neighboring translational motion information of each control point. The motion information for the control point is derived from the specified spatial neighbors and temporal neighbor as shown in FIG. 8. $CPMV_k$ (k=1, 2, 3, 4) represents the k-th control point. For $CPMV_1$, the checking order is B2, B3, then A2, and the MV of the first available block is used. For $CPMV_2$, the checking order is B1 then B0, and for $CPMV_3$, the checking order is A1 then A0. The temporal MVP is used as $CPMV_4$ if it is available.

After MVs of four control points are attained, affine Merge candidates are constructed based on those motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}. The combination of 3 CPMVs constructs a 6-parameter affine Merge candidate and the combination of 2 CPMVs constructs a 4-parameter affine Merge candidate. To avoid the motion scaling process, if the reference indices of control points are different, the related combination of control point MVs is discarded. After inherited affine Merge candidates and constructed affine Merge candidate are checked, if the list is still not full, zero MVs are inserted to the end of the list.

The affine AMVP mode can be applied for CUs with both width and height larger than or equal to 16. An affine flag in a CU level is signaled in the video bitstream to indicate whether affine AMVP mode is used and then another flag is signaled to indicate whether 4-parameter affine or 6-parameter affine is used. In the affine AMVP mode, the difference of the control point MVs of a current CU and their predictors CPMVPs are signaled in the video bitstream. The affine AMVP candidate list size is 2 and it is generated by using four types of control point MV candidates in order. The first type of control point MV candidates is inherited affine AMVP candidates that extrapolated from control point MVs of the neighboring CUs. The second type is constructed affine AMVP candidate CPMVPs that are derived using the translational MVs of the neighboring CUs. The third type of control point MV candidates is translational MVs from neighboring CUs, and the fourth type is the zero MVs. The checking order of inherited affine AMVP candidates is the same as the checking order of inherited affine Merge candidates. The only difference is that only the affine CU having the same reference picture as the reference picture of the current block is considered when generating the inherited affine AMVP candidate. A pruning process is not applied when inserting an inherited affine motion predictor into the candidate list. A constructed AMVP candidate is derived from specified spatial neighbors as shown in FIG. 8. The same checking order is used in deriving a constructed affine AMVP candidate and deriving an affine Merge candidate. In addition, a reference picture index of the neighboring block is also checked. The first block in the checking order that is inter coded and has the same reference picture as the current CU is used. There is only one constructed AMVP candidate when the current CU is coded with a 4-parameter affine model and both of the two CPMVs are available, these two CPMVs are added as one candidate in the affine AMVP candidate list. The three CPMVs are added as one candidate in the affine AMVP candidate list when the current CU is coded with a 6-parameter affine model and all three CPMVs are available. Otherwise, the constructed AMVP candidate is set as unavailable. In cases when the number of candidates in the affine AMVP candidate list is less than 2 after checking inherited affine AMVP candidates and constructed AMVP candidate, one or more available CPMVs will be added as the translational MVs to predict all control point MVs of the current CU. Finally, zero MVs are used to fill the affine AMVP candidate list if it is still not full.

In the development of the VVC standard, CPMVs of affine CUs are stored in a separate buffer. The stored CPMVs are only used to generate inherited CPMVPs in the affine Merge mode and affine AMVP mode for later coded CUs. The subblock MVs derived from CPMVs are used for motion compensation, MV derivation of the Merge/AMVP candidate list of translational MVs and deblocking. In order to avoid a picture line buffer for additional CPMVs, affine motion data inheritance from the CUs located in an above CTU is treated differently to the inheritance from normal neighboring CUs. If the candidate CU for affine motion data inheritance is in the above CTU line, the bottom-left and bottom-right subblock MVs in the line buffer instead of the CPMVs are used for affine MVP derivation. In this way, the CPMVs are only stored in the local buffer. The affine model is degraded to a 4-parameter model if the candidate CU is 6-parameter affine coded.

Prediction Refinement with Optical Flow for Affine Mode

Subblock based affine motion compensation may save the memory access bandwidth and reduce the computation complexity compared to pixel based affine motion compensation at the cost of prediction accuracy penalty. To achieve a finer granularity of motion compensation, Prediction Refinement with Optical Flow (PROF) is employed to refine the subblock based affine motion compensated prediction without increasing the memory access bandwidth for motion compensation, In the development of the VVC standard, after the subblock based affine motion compensation is performed, a luma prediction sample is refined by adding a difference derived by the optical flow equation. The PROF process is described in the following four steps.

In the first step, the subblock-based affine motion compensation is performed to generate subblock prediction $I(i, j)$. In the second step, spatial gradients $g_x(i, j)$ and $g_y(i, j)$ of the subblock prediction are calculated at each sample location using a 3-tap filter [−1, 0, 1]. The gradient calculation is exactly the same as the gradient calculation in Bi-Directional Optical Flow (BDOF). The spatial gradients are calculated by:

$$g_x(i,j)=(I(i+1,j)\gg\text{shift1})-(I(i-1,j)\gg\text{shift1})$$

$$g_y(i,j)=+1)\gg\text{shift1})-(I(i,j-1)\gg\text{shift1})$$

where shift1 is used to control the precision of the spatial gradients. The subblock (i.e. 4×4 block) prediction is extended by one sample on each side for the gradient calculation. To avoid additional memory bandwidth and additional interpolation computation, those extended samples on the extended borders are copied from the nearest integer pixel position in the reference picture.

In the third step, the luma prediction refinement is calculated by the following optical flow equation:

$$\Delta I(i,j)=g_x(i,j)*\Delta v_x(i,j)+g_y(i,j)*\Delta v_y(i,j)$$

where $\Delta v(i, j)$ is a difference between a sample MV $v(i, j)$ computed for the sample location $(i, j)$, and a subblock MV of the subblock to which sample $(i, j)$ belongs. The MV difference $\Delta v(i, j)$ is quantized in the unit of 1/32 luma sample precision.

Since the affine model parameters and the sample location relative to the subblock center are not changed from subblock to subblock, the MV difference $\Delta v(i, j)$ can be calculated for the first subblock, and reused for other subblocks in the same CU. Let $dx(i, j)$ and $dy(i, j)$ be the horizontal and vertical offset from the sample location $(i, j)$ to the center of the subblock $(x_{SB}, y_{SB})$, the MV difference $\Delta v(x, y)$ can be derived by the following equations:

$$\begin{cases} dx(i, j) = i - x_{SB} \\ dy(i, j) = j - y_{SB} \end{cases}$$

$$\begin{cases} \Delta v_x(i, j) = C*dx(i, j) + D*dy(i, j) \\ \Delta v_y(i, j) = E*dx(i, j) + F*dy(i, j) \end{cases}$$

In order to keep the accuracy, the center of the subblock $(x_{SB}, y_{SB})$ is calculated as $((WSB-1)/2, (HSB-1)/2)$, where WSB and HSB are the subblock width and height, respectively. For a 4-parameter affine model, $$\begin{cases} C = F = \dfrac{v_{1x} - v_{0x}}{w} \\ E = -D = \dfrac{v_{1y} - v_{0y}}{w} \end{cases}$$

For a 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

In the fourth step, the luma prediction refinement $\Delta I(i, j)$ is added to the subblock prediction $I(i, j)$. The final prediction I' is generated as the following equation.

$$I'(i,j)=I(i,j)+\Delta I(i,j)$$

There are two cases that PROF is skipped for an affine coded CU, where the first case is when all control point MVs are the same, indicating the CU only has translational motion, and the second case is when the affine motion parameters are greater than a specified limit because the subblock based affine-based affine motion compensation is degraded to CU based motion compensation to avoid large memory access bandwidth requirement.

A fast encoding method is applied to reduce the encoding complexity of affine motion estimation with PROF by skip applying PROF in some situations. For example, PROF is not applied at the affine motion estimation stage in following two situations. The first situation is when a current CU is not the root block and its parent block does not select the affine mode, PROF is not applied to this situation since the possibility for the current CU to select the affine mode as the best mode is low. The second situation is when the magnitudes of four affine parameters are all smaller than a predefined threshold and the current picture is not a low delay picture, PROF is not applied because the improvement introduced by PROF is small for this situation.

Subblock-Based Temporal Motion Vector Prediction (SbTMVP)

The VVC standard supports the subblock-based temporal motion vector prediction method. Similar to the Temporal Motion Vector Prediction (TMVP) in the HEVC standard, SbTMVP uses the motion field in the collocated picture to improve motion vector prediction and Merge mode for CUs in the current picture. The same collocated picture used by TMVP is used for SbTMVP. SbTMVP differs from TMVP in the following two main aspects. TMVP predicts motion at the CU level but SbTMVP predicts motion at the sub-CU level. TMVP fetches the temporal motion vectors from the collocated block in the collocated picture, where the collocated block is the bottom-right or center block relative to the current CU, whereas SbTMVP applies a motion shift before fetching the temporal motion information from the collocated picture, where the motion shift is obtained from the motion vector of one spatial neighboring block of the current CU.

SbTMVP predicts motion vectors of the sub-CUs within the current CU in two steps. In the first step, the lower-left neighboring block of the current CU is examined, and if there is a motion vector in this lower-left neighboring block uses the collocated picture as its reference picture, this motion vector is selected to be the motion shift to be applied. If there is no such motion vector, the motion shift is set to (0,0). In the second step, the motion shift identified in the first step is added to the coordinate of the current block to obtain sub-CU-level motion information from the collocated picture. For each sub-CU, motion information of its corresponding block in the collocated picture is used to derive the motion information for the sub-CU. The corresponding block is the smallest motion grid that covers the center sample. After the motion information of the collocated sub-CU is identified, it is converted to the motion vectors and reference indices of the current sub-CU in a similar way as the TMVP process in the HEVC standard. Temporal motion scaling is applied to align the reference pictures of the temporal motion vectors to those of the current CU.

In the development of the VVC standard, a combined subblock based Merge list which contains both SbTMVP candidate and affine Merge candidate is used for signaling of the subblock based Merge mode. The SbTMVP mode is enabled or disabled according to a Sequence Parameter Set (SPS) flag. A SbTMVP predictor is added as a first entry of the list of subblock based Merge candidates followed by affine Merge candidates if the SbTMVP mode is enabled. The size of the subblock based Merge candidate list is signaled in the SPS, for example, the maximum allowed size of the subblock based Merge list is 5. The sub-CU size used in SbTMVP is fixed to 8×8 samples, and similar to the affine Merge mode, the SbTMVP mode is only applicable to the CU with both width and height are larger than or equal to 8. The encoding logic of the additional SbTMVP Merge candidate is the same as for the other Merge candidates, that is, for each CU in a P or B slice, an additional rate-distortion check is performed to decide whether to use the SbTMVP candidate.

Intra Block Copy (IBC)

IBC is a tool adopted in the HEVC extension for Screen Content Coding (SCC) which significantly improves the coding efficiency of screen content materials. Since IBC is implemented as a block level coding mode, Block Matching (BM) is performed at the encoder to find the optimal block vector or motion vector for each CU. A block vector is used to indicate the displacement form the current block to a reference block which is already reconstructed inside the current picture. A luma block vector of an IBC-coded CU is in integer precision. A chroma block vector of an IBC-coded CU is also rounded to integer prediction. The IBC mode can switch between 1-pel and 4-pel motion vector precisions when combined with AMVR. An IBC-coded CU is treated as the third prediction mode other than intra or inter prediction modes. The IBC mode is applicable to CUs with both width and height smaller than or equal to 64 luma samples. There are two IBC modes in the VVC standard including IBC AMVP mode and IBC Merge mode. The IBC Merge mode is similar to regular Merge mode, however, IBC Merge mode has its own Merge candidate list.

At the encoder side, hash-based motion estimation is performed in IBC. The encoder performs rate-distortion check for blocks with either width or height less than or equal to 16 luma samples. For non-Merge mode, the block vector search is performed using a hash-based search. If hash search does not return any valid candidate, block matching based local search will be performed. In the hash-based search, hash key matching (32-bit CRC) between the current block and a reference block is extended to all allowed block sizes. The hash key calculation for every position in the current picture is based on each 4×4 subblock. For the current block with a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference block are calculated and the one with the minimum cost is selected.

In the block matching search, the search range is set to cover both the previous and current CTUs. At a CU level, the IBC mode is signaled with a flag and it can be signaled as the IBC AMVP mode or IBC Skip/Merge mode. For a current CU coded in the IBC Skip/Merge mode, a Merge candidate index is used to indicate which of the block vectors in the Merge candidate list constructed from neighboring candidate IBC coded blocks is used to predict the current CU. The Merge candidate list consists of spatial, HMVP, and pairwise candidates. For a current CU coded in the IBC AMVP mode, a block vector difference is coded in the same way as a motion vector difference. The block vector prediction method uses two candidates as predictors, one from left neighbor and one from above neighbor if these neighbors are IBC coded. A default block vector will be used as a predictor when either neighbor is unavailable. A flag is signaled to indicate the block vector predictor index.

The encoder selects one final candidate from a corresponding Merge candidate list for each block coded in the regular Merge mode, subblock Merge mode, TPM Merge mode, or IBC Merge mode based on motion vector compensation such as through a Rate-Distortion Optimization (RDO) decision, and an index representing the selected final candidate is signaled to the decoder. The decoder selects the same final candidate from the Merge candidate list according to the index transmitted in the video bitstream.

IBC Reference Region

The reference region for an IBC coded CU in a current CTU according to VVC Test Model 7 (VTM7) is the reconstructed portion of a predefined area including the region of the current CTU and some regions of the left CTU in order to reduce the memory consumption and decoder complexity. The reference region for a current block depends on the location of the current block within the current CTU. When the current block falls into a top-left 64×64 block of the current CTU, in addition to the already reconstructed samples in the current CTU, the reference region also includes reference samples in the bottom-right 64×64 block of the left CTU using the IBC mode. The current block can also refer to reference samples in the bottom-left 64×64 block of the left CTU and reference samples in the top-right 64×64 block of the left CTU using the IBC mode. When the current block falls into the top-right 64×64 block of the current CTU, in addition to the already reconstructed samples in the current CTU, if the luma location (0, 64) relative to the current CTU has not yet been reconstructed, the current block can also refer to reference samples in the bottom-left 64×64 block and bottom-right 64×64 block of the left CTU using the IBC mode; otherwise the current block can also refer to reference samples in the bottom-right 64×64 block of the left CTU. When the current block falls into the bottom-left 64×64 block of the current CTU, in addition to the already reconstructed samples in the current CTU, if the luma location (64,0) relative to the current CTU has not yet been reconstructed, the current block can also refer to reference samples in the top-right 64×64 block and bottom-right 64×64 block of the left CTU using the IBC mode; otherwise the current block can also refer to reference samples in the bottom-right 64×64 block of the left CTU using the IBC mode. When the current block falls into the bottom-right 64×64 block of the current CTU, it can only refer to the already reconstructed samples in the current CTU using the IBC mode. The above restriction allows the IBC mode to be implemented using the local on-chip memory for hardware implementation.

IBC Interaction with Other Coding Tools

The interaction between the IBC mode and other inter coding tools in VTM7, such as pairwise Merge candidate, History based Motion Vector Predictor (HMVP), Combined Intra/Inter Prediction mode (CIIP), Merge mode with Motion Vector Difference (MMVD), and triangle partition, are described in the following. The IBC mode can be used with the pairwise Merge candidate and HMVP. A new pairwise IBC Merge candidate can be generated by averaging IBC Merge candidates. For HMVP, IBC motion is inserted into the history buffer for future referencing. The IBC mode cannot be used in combination with affine motion, CIIP, MMVD, and triangle partition mode. The IBC mode is not allowed to be used for chroma coding blocks when dual tree partitioning is selected.

Unlike in the HEVC screen content coding extension, the current picture is no longer included as one of the reference pictures in the reference picture list 0 for IBC prediction. The derivation process of motion vectors for the IBC mode excludes all neighboring blocks in the inter mode and vice versa. The IBC mode shares the same process as in the regular MV Merge mode with pairwise Merge candidate and history based motion vector, however TMVP and zero vector are disallowed because they are invalid for the IBC mode. A separate HMVP buffer with 5 candidates is used for the conventional MV and IBC. Block vector constraints are implemented in the form of bitstream conformance constraint, the encoder needs to ensure that invalid vectors are not present in the video bitstream, and merging is not allowed if the Merge candidate is invalid. Such bitstream conformance constraint is expressed in terms of a virtual buffer as described below. To perform deblocking on blocks coded using the IBC mode, it is handled in a way the same as blocks coded using the Inter mode. If the current block is coded using the IBC mode, AMVR does not allow quarter-pel; instead, AMVR is signaled to only indicate whether MV is inter-pel or 4 integer-pel. The number of IBC Merge candidates list can be signaled in the slice header separately from the numbers of regular Merge, subblock Merge, and triangle Merge candidate lists.

A virtual buffer concept is used to describe the allowable reference region for the IBC prediction mode and valid block vectors. The virtual buffer, ibcBuf, has a width being wIbcBuff=128*128/ctbSize, and a height being hIbcBuff=ctbSize, where ctbSize is the size of a CTU. For example, the size of ibcBuf is 128*128 when the CTU size is equal to 128*128, the size of ibcBuf is 256*64 when the CTU size is equal to 64*64, and the size of ibcBuf is 512*32 when the CTU size is equal to 32*32. The size of a Virtual Processing Data Unit (VPDU) is a minimum of ctbSize and 64 in each dimension (e.g. $W_v$=min(ctbSize, 64)).

The virtual IBC buffer is refreshed with an invalid value −1 at the beginning of decoding each CTU row. At the beginning of decoding a VPDU, where (xVPDU, yVPDU) is relative to the top-left corner of the picture, the virtual IBC buffer is set to ibcBuf[x][y]=−1, with x=xVPDU % wIbcBuf, . . . , xVPDU % wIbcBuf+$W_v$−1; y=yVPDU % ctbSzie+$W_v$−1. After decoding a CU contains (x,y) relative to the top-left corner of the picture, the virtual IBC buffer is set to ibcBuf[x % wIbcBuf][y % ctbSize]=recSample [x][y]. For a block covering the coordinates (x,y) if the following is true for a block vector bv=(bv[0],bv[1]), then it is valid, otherwise it is invalid. The value ibcBuf[(x+bv[0]) % wIbcBuf] [(y+bv[1]) % ctbSize] shall not be equal to −1.

BRIEF SUMMARY OF THE INVENTION

In exemplary embodiments of a video processing method, a video encoding system receives input video data to be encoded, determines a Merge number for a regular Merge mode and a Merge number for a GPM Merge mode, computes a difference between the Merge number for the regular Merge mode and the Merge number for the GPM Merge mode, compares the Merge number for the regular Merge mode with a predefined value, signals the difference in a video bitstream if the Merge number for the regular Merge mode is larger than or equal to the predefined value, and encodes each block to be coded in the regular Merge mode by constructing a regular Merge candidate list and encodes each block to be coded in the GPM Merge mode by constructing a GPM Merge candidate list. The Merge number for the regular Merge mode defines a number of candidates included in each regular Merge candidate list and the Merge number for the GPM Merge mode defines a number of candidates included in each GPM Merge candidate list. The predefined value is a positive integer, for example, the predefined value is equal to 3.

In some embodiments, the video encoding system further signals a syntax element related to the Merge number for the regular Merge mode at a same level as signaling a syntax element related to the difference between the Merge number for the regular Merge mode and the Merge number for the GPM Merge mode. An embodiment of the video encoding system also signals syntax elements related to Merge numbers for an IBC Merge mode and a subblock Merge mode at the same level as signaling the syntax elements related to the Merge number for the regular Merge mode. The same level is a sequence level according to one embodiment, for example, the syntax element related to the Merge number for the regular Merge mode and syntax element related to the difference between the Merge number for the regular Merge mode and the Merge number for the GPM Merge mode are signaled in a Sequence Parameter Set (SPS). In another embodiment, the same level is a picture level, where the syntax element related to the Merge number for the regular Merge mode and the syntax element related to the difference between the Merge number for the regular Merge mode and the Merge number for the GPM Merge mode are signaled in a Picture Parameter Set (PPS).

An embodiment of the Merge number for the regular Merge mode restricts the value to be within a range of 1 to 6, inclusively. According to one embodiment, a value of the Merge number for the GPM Merge mode is restricted to be within a range of 2 to the Merge number for the regular Merge mode, inclusively.

The Merge number for the GPM Merge mode is set to 0 when the Merge number for the regular Merge mode is less than the predefined value, indicating the GPM Merge mode is not allowed.

An embodiment of the video processing method implemented in a video decoding system receives input video data in a video bitstream, determines a Merge number for a regular Merge mode by parsing a syntax element signaled in the video bitstream, compares the Merge number for the regular Merge mode with a predefined value, determines a difference between the Merge number for the regular Merge mode and a Merge number for a GPM Merge mode by parsing a syntax element signaled in the video bitstream if the Merge number for the regular Merge mode is larger than or equal to the predefined value, computes the Merge number for the GPM Merge mode by subtracting the difference between the Merge numbers from the Merge number for the regular Merge mode, and decodes each block coded in the regular Merge mode by constructing a regular Merge candidate list and decodes each block coded in the GPM Merge mode by constructing a GPM Merge candidate list. The Merge number for the regular Merge mode defines a number of candidates included in each regular Merge candidate list, and the Merge number for the GPM Merge mode defines a number of candidates included in each GPM Merge candidate list. The predefined value is a positive integer, for example, the predefined value is equal to 3. The difference between the Merge numbers is inferred to be 0 when the Merge number for the regular Merge mode is larger than or equal to the predefined value.

In some embodiments of the video decoding system, the difference between the Merge numbers is determined by parsing a syntax element related to the difference from a same level as parsing a syntax element related to the Merge number for the regular Merge mode. In one embodiment, the same level is a sequence level, for example the syntax element related to the Merge number for the regular Merge mode and the syntax element related to the difference between the Merge numbers are signaled in a SPS. In another embodiment, the same level is a picture level, for example, the syntax element related to the Merge number for the regular Merge mode and the syntax element related to the difference between the Merge numbers are signaled in a PPS. In one embodiment, the video decoding system further comprises parsing syntax elements related to Merge numbers for an IBC Merge mode and a subblock Merge mode at the same level as parsing the syntax elements related to the Merge numbers for the regular Merge mode and the GPM Merge mode.

In one embodiment of the video decoding system, a value of the Merge number for the regular Merge mode is restricted to be in a range of 1 to 6, inclusively. A value of the Merge number for the GPM Merge mode is restricted to be in a range of 2 to the Merge number for the regular Merge mode, inclusively. The video decoding system infers the Merge number for the GPM Merge mode to be equal to 0 when the Merge number for the regular Merge mode is less than the predefined value, indicating the GPM Merge mode is not allowed.

Aspects of the disclosure further provide an apparatus for performing video processing in a video encoding system. The apparatus comprises one or more electronic circuits configured for receiving input video data, determines Merge numbers for regular and GPM Merge modes, computes a difference between the Merge numbers, compares the Merge number for the regular Merge mode with a predefined value, signals the difference between the Merge numbers in a video bitstream if the Merge number for the regular Merge mode is larger than or equal to the predefined value, and encodes each block to be coded in the regular Merge mode by constructing a regular Merge candidate list and encodes each block to be coded in the GPM Merge mode by constructing a GPM Merge candidate list. An apparatus for performing video processing in a video decoding system comprises one or more electronic circuits configured for receiving input video data in a video bitstream, determining a Merge number for a regular Merge mode from the video bitstream, comparing the Merge number for the regular Merge mode with a predefined value, determining a difference between the Merge number for the regular Merge mode and a Merge number for a GPM Merge mode from the video bitstream if the Merge number for the regular Merge mode is larger than or equal to the predefined value, computing the Merge number for the GPM Merge mode based on the difference between the Merge numbers, and decoding each block coded in the regular Merge mode by constructing a regular Merge candidate list and decoding each block coded in the GPM Merge mode by constructing a GPM Merge candidate list. The difference between the Merge numbers is inferred to be 0 when the Merge number for the regular Merge mode is less than the predefined value.

Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 1:
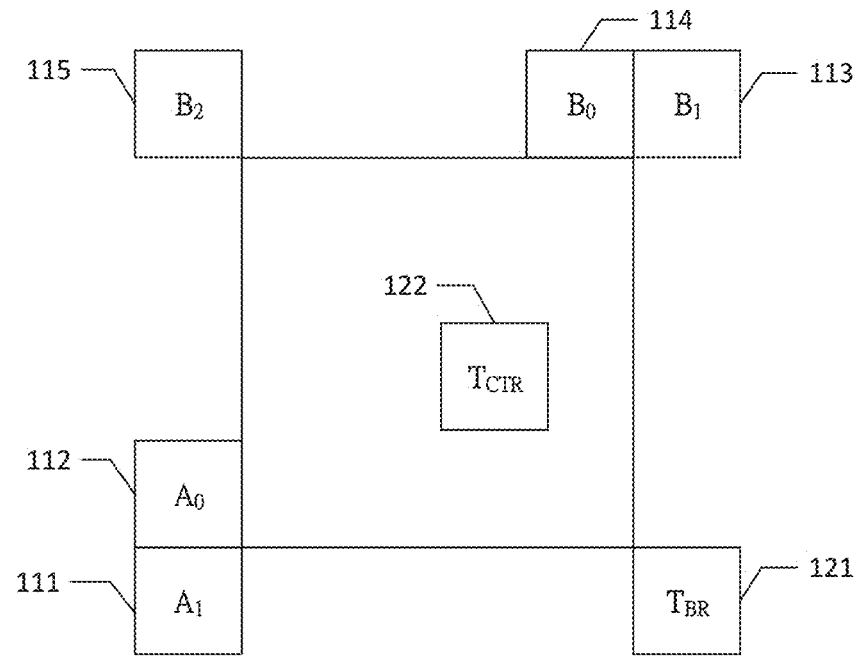
FIG. 1 illustrates locations of spatial candidates and temporal candidates for constructing a Merge candidate list for the regular Merge mode in the VVC standard.
Figure 2:
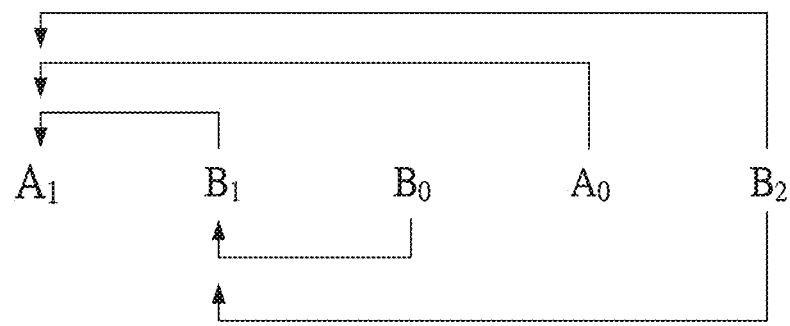
FIG. 2 illustrates a simplified pruning process for comparing spatial candidates to check for redundancy.
Figures 3, 4:
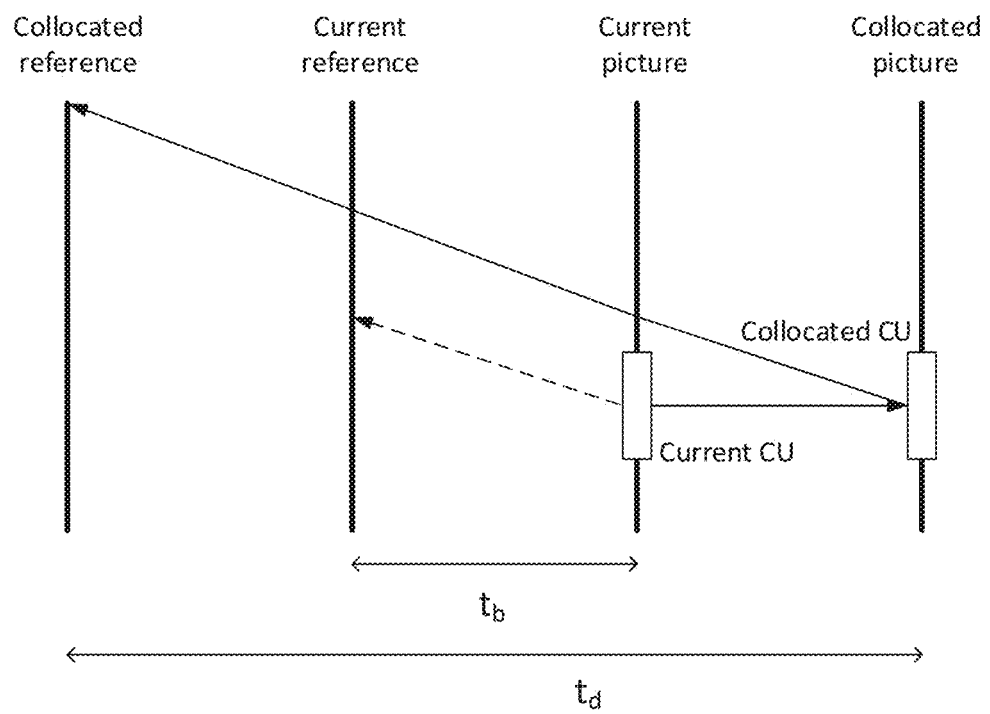
FIG. 3 illustrates an example of deriving a scaled MV of a temporal candidate based on a collocated CU in a collocated reference picture.
FIG. 4 illustrates uni-prediction MV selection for the triangle partition mode.
Figures 5A, 5B, 6:
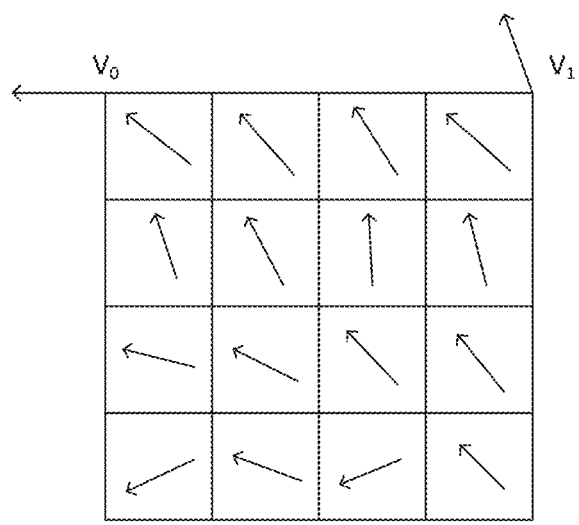
FIG. 5A illustrates an example of applying a first weighting factor group to the diagonal edge between two sub-blocks of a luma block coded in the triangular prediction mode.
FIG. 5B illustrates an example of applying a first weighting factor group to the diagonal edge between two sub-blocks of a chroma block coded in the triangular prediction mode.
FIG. 6 illustrates affine motion vector fields for a block coded using a four parameter affine model.
Figure 7:
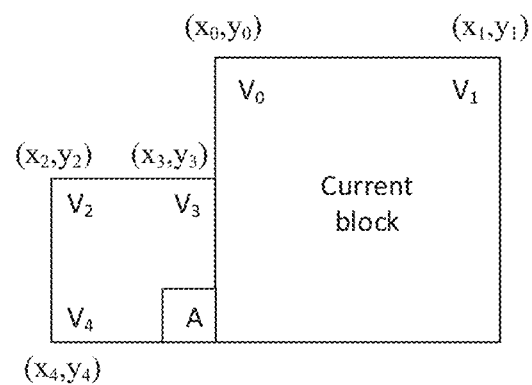
FIG. 7 illustrates an example of control point motion vector inheritance for constructing an affine Merge candidate list for a current block.
Figure 8:
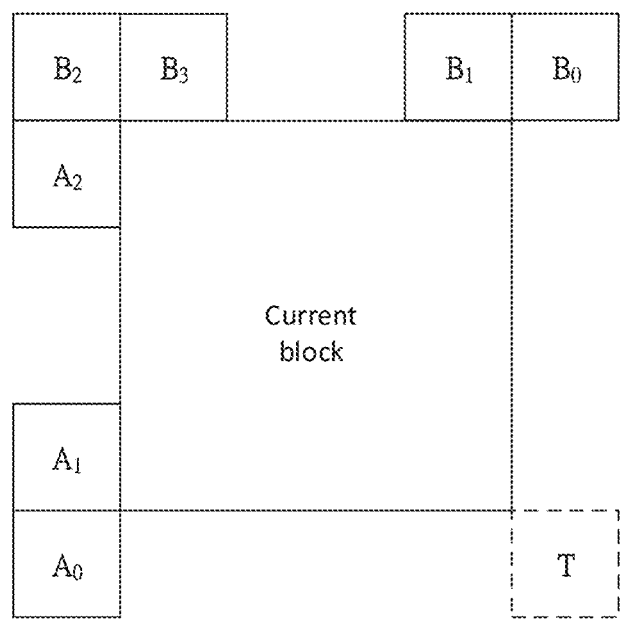
FIG. 8 illustrates locations of spatial and temporal neighbors for generating a constructed affine candidate by combining neighbor translational motion information of each control point.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

All Merge Numbers Signal at Same Level

In VVC Draft 7, Merge numbers for the regular Merge mode, Geometric Partition Mode (GPM) Merge mode, IBC Merge mode, and subblock Merge mode are signaled at different syntax levels. GPM is a coding tool designed to replace former TPM, where GPM is more flexible compared to TPM as it allows a current block to be split into two arbitrary partitions by a straight line. In the following descriptions, various embodiments of signaling methods referring to TPM can also be implemented for signaling syntax elements related to GPM. The Merge number for the regular Merge mode defines a number of candidates included in each regular Merge candidate list, which indicates the maximum allowed size of each regular Merge candidate list. The Merge number for the GPM Merge mode defines a number of candidates included in the GPM Merge candidate list, which indicates the maximum allowed size of each GPM Merge candidate list. Similarly, the Merge numbers for the IBC Merge mode and subblock Merge mode define numbers of candidates included in the IBC Merge candidate list and subblock Merge candidate list respectively. The syntax design of VV7 Draft 7 signals syntax elements related to the Merge numbers for the regular Merge mode and GPM Merge mode in both the Picture Parameter Set (PPS) and Picture Header (PH), however, the syntax elements related to the Merge numbers for the IBC Merge mode and subblock Merge mode are only signaled in a PH. Since mode candidate syntax elements usually stay constant for all slices associated with a PH, various embodiments of the present invention signal all Merge numbers at the same level. In some embodiments, all the Merge numbers are signaled in a picture level such as signaling all syntax elements related to the Merge numbers in the PPS, and in some other embodiments, all the Merge numbers are signaled in a sequence level such as signaling all syntax elements related to the Merge numbers in the Sequence Parameter Set (SPS).

Some embodiments of the present invention move signaling of syntax elements related to Merge numbers from the PH to the SPS, where the syntax elements related to the Merge numbers include syntax elements for the regular Merge mode, subblock Merge mode, GPM Merge mode, and IBC Merge mode. An embodiment of syntax element signaling modification for the regular Merge mode signals a Merge number of regular Merge candidates only in a SPS, and in this embodiment, related syntax elements originally signaled in a PH and PPS are removed as demonstrated in the following.

| pic_parameter_set_rbsp( ) { | Descriptor |
|---|---|
| ... ... | |
| constant_slice_header_params_enabled_flag | u(1) |
| if( constant_slice_header_params_enabled_flag ) { | |
| ... ... | |
| ~~pps_six_minus_max_num_merge_cand_plus1~~ | ~~ue(v)~~ |
| ... ... | |
| } | |
| ... ... | |
| } | |

| picture_header_rbsp( ) { | Descriptor |
|---|---|
| ... ... | |
| ~~if( !pps_six_minus_max_num_merge_cand_plus1 )~~ | |
| ~~pic_six_minus_max_num_merge_cand~~ | ~~ue(v)~~ |
| ... ... | |
| } | |

| seq_parameter_set_rbsp( ) { | Descriptor |
|---|---|
| ... ... | |
| sps_six_minus_max_num_merge_cand | ue(v) |
| ... ... | |
| } | |

In this embodiment, the syntax element sps_six_minus_max_num_merge_cand signaled in a SPS specifies the maximum number of merging motion vector prediction candidates supported in the slices associated with the SPS subtracted from 6. The Merge number of merging MVP candidates, MaxNumMergeCand, is derived by:

MaxNumMergeCand=6−sps_six_minus_max_num_merge_cand;

where the value MaxNumMergeCand shall be in the range of 1 to 6 inclusively.

In this embodiment, the syntax element related to a Merge number of IBC Merge candidates is signaled in a SPS and the related syntax element for the IBC Merge mode is removed from a PH as demonstrated in the following.

| picture_header_rbsp( ) { | Descriptor |
|---|---|
| ... ... | |
| ~~if( sps_ibc_enabled_flag )~~ | |
| ~~pic_six_minus_max_num_ibc_merge_cand~~ | ~~ue(v)~~ |
| ... ... | |
| } | |

| seq_parameter_set_rbsp( ) { | Descriptor |
|---|---|
| ... ... | |
| if ( sps_ibc_enabled_flag ) | |

```
    sps_six_minus_max_num_ibc_merge_cand          ue(v)
    ... ...
}
```

The syntax element sps_six_minus_max_num_ibc_merge_cand signaled in the SPS specifies the maximum number of IBC merging Block Vector Prediction (BVP) candidates supported in the slices associated with the SPS subtracted from 6. The Merge number of IBC merging BVP candidates, MaxNumIbcMergeCand, is derived by:

MaxNumIbcMergeCand=6−sps_six_minus_max_num_ibc_merge_cand;

where the value of MaxNumIbcMergeCand shall be in the range of 1 to 6 inclusively.

In this embodiment, the syntax element related to a Merge number of subblock Merge candidates is signaled in a SPS for the subblock Merge mode as demonstrated in the following.

```
picture_header_rbsp( ) {                                     Descriptor
    ... ...
    if( sps_affine_enabled_flag )
        pic_five_minus_max_num_subblock_merge_cand           ue(v)
    ... ...
}
```

```
seq_parameter_set_rbsp( ) {                                  Descriptor
    ... ...
    if( sps_affine_enabled_flag )
        sps_five_minus_max_num_subblock_merge_cand           ue(v)
    ... ...
}
```

There are two examples of semantics for the newly added syntax element sps_five_minus_max_num_subblock_merge_cand. In the first example, this syntax element sps_five_minus_max_num_subblock_merge_cand specifies a maximum number of subblock based merging Motion Vector Prediction (MVP) candidates supported in the slice subtracted from 5. For each picture, if this syntax element is present, the Merge number of subblock based merging MVP candidates, MaxNumSubblockMergeCand, is derived by:

MaxNumSubblockMergeCand=5−sps_five_minus_max_num_subblock_merge_cand;

and if this syntax element is not present, the Merge number of subblock based merging MVP candidates, MaxNumSubblockMergeCand is derived by:

MaxNumSubblockMergeCand=sps_sbtmvp_enabled_flag && pic_temporal_mvp_enabled_flag;

where the value of MaxNumSubblockMergeCand shall be in the range of 0 to 5, inclusively. In the second example, the syntax element pic_temporal_mvp_enabled_flag (or may be called as ph_temporal_mvp_enabled_flag) is removed from the PH. The syntax element sps_five_minus_max_num_subblock_merge_cand specifies a maximum number of subblock based merging MVP candidates supported in the slice subtracted from 5. In cases when the syntax element sps_five_minus_max_num_subblock_merge_cand is not present, the value of this syntax element is inferred to be equal to 5−(sps_sbtmvp_enabled_flag && sps_temporal_mvp_enabled_flag). The Merge number of subblock based merging MVP candidates, MaxNumSubblockMergeCand, is derived by:

MaxNumSubblockMergeCand=5−sps_five_minus_max_num_subblock_merge_cand;

where the value of MaxNumSubblockMergeCand shall be in the range of 0 to 5, inclusively.

In this embodiment, the syntax element related to a Merge number of TPM Merge candidates is signaled in a SPS and the related syntax element for the TPM Merge mode is removed from the PH and PPS as demonstrated in the following.

```
pic_parameter_set_rbsp( ) {                                  Descriptor
    ... ...
    constant_slice_header_params_enabled_flag                u(1)
    if( constant_slice_header_params_enabled_flag ) {
        ... ...
        pps_max_num_merge_cand_minus_max_num_triangle_cand_plus1   ue(v)
    }
    ... ...
}
```

| picture_header_rbsp( ) { | Descriptor |
|---|---|
| ... ... | |
| ~~if( sps_triangle_enabled_flag && MaxNumMergeCand >= 2 &&~~ | |
| ~~!pps_max_num_merge_cand_minus_max_num_triangle_cand_plus1 )~~ | |
| ~~pic_max_num_merge_cand_minus_max_num_triangle_cand~~ | ~~ue(v)~~ |
| ... ... | |
| } | |

| seq_parameter_set_rbsp( ) { | Descriptor |
|---|---|
| ... ... | |
| if( sps_triangle_enabled_flag && MaxNumMergeCand >= 2) | |
|     sps_max_num_merge_cand_minus_max_num_triangle_cand | ue(v) |
| ... ... | |
| } | |

The syntax element sps_max_num_merge_cand_minus_max_num_triangle_cand specifies a maximum number of triangular Merge mode candidates supported in the slices associated with the SPS subtracted from the Merge number of the regular Merge mode candidates, MaxNumMergeCand. The Merge number of triangular Merge mode candidates, MaxNumTriangleMergeCand, is derived by:

MaxNumTriangleMergeCand=MaxNumMergeCand−sps_max_num_merge_cand_minus_max_num_tirangle_cand.

In one example of signaling a Merge number for the TPM Merge mode, the value of MaxNumTriangleMergeCand shall be in the range of 2 to MaxNumMergeCand, inclusively, when the syntax element sps_max_num_merge_cand_minus_max_num_triangle_cand is present. In cases when the syntax element sps_max_num_merge_cand_minus_max_num_triangle_cand is not present, and when sps_triangle_enabled_flag is equal to 0 or MaxNumMergeCand is less than 2, MaxNumTriangleMergeCand is set to 0, implies the TPM Merge mode is not allowed for the slices associated with the PH. In another example, the value of MaxNumTriangleMergeCand shall be in the range of 1 to MaxNumMergeCand, inclusively, when the syntax element sps_max_num_merge_cand_minus_max_num_triangle_cand is present. When the syntax element sps_max_num_merge_cand_minus_max_num_triangle_cand is not present, and either the SPS level flag sps_triangle_enabled_flag is equal to 0 or MaxNumMergeCand is less than 2, the value of MaxNumTriangleMergeCand is set to 0. In this embodiment, the TPM Merge mode is not allowed for the slices associated with the PH when MaxNumTriangleMergeCand is equal to or less than 1.

In a more general example of signaling a Merge number for the TPM Merge mode, the encoder may determine a threshold N for signaling the syntax element sps_max_num_merge_cand_minus_max_num_triangle_cand. In this example, the syntax element sps_max_num_merge_cand_minus_max_num_triangle_cand is only signaled when the SPS level flag sps_triangle_enabled_flag is 1 and the value of MaxNumMergeCand is greater than or equal to the threshold N.

| seq_parameter_set_rbsp( ) { | Descriptor |
|---|---|
| ... ... | |
| if( sps_triangle_enabled_flag && MaxNumMergeCand >= N) | |
|     sps_max_num_merge_cand_minus_max_num_triangle_cand | ue(v) |
| ... ... | |
| } | |

The threshold N is a positive integer, and the semantics definition of the syntax element sps_max_num_merge_cand_minus_max_num_triangle_cand is inferred to be equal to 0 if it is not present and when the SPS level flag sps_triangle_enabled_flag is equal to 0 and the value of MaxNumMergeCand is less than N.

In yet another example, the syntax element sps_max_num_merge_cand_minus_max_num_triangle_cand is signaled when the SPS level flag sps_triangle_enabled_flag is equal to 1.

| seq_parameter_set_rbsp( ) { | Descriptor |
|---|---|
| ... ... | |
| if( sps_triangle_enabled_flag) | |
|     sps_max_num_merge_cand_minus_max_num_triangle_cand | ue(v) |
| ... ... | |
| } | |

The TPM Merge mode is not allowed for the associated slices when the value of MaxNumTriangleMergeCand is less than or equal to 1 according to this example. Moreover, the signaling range of the syntax element sps_max_num_merge_cand_minus_max_num_triangle_cand shall make sure the formula derivation of MaxNumTriangleMergeCand=MaxNumMergeCand−sps_max_num_merge_cand_minus_max_num_triangle_cand will result in the value of MaxNumTriangleMergeCand greater than or equal to 1.

In some embodiments, the picture level flag pic_temporal_mvp_enabled_flag is removed from the PH as shown in the following. The temporal MVP is determined to be enabled or disabled according to the SPS level flag sps_temporal_mvp_enabled_flag.

| picture_header_rbsp( ) { | Descriptor |
|---|---|
| ... ... | |
| ~~if( sps_temporal_mvp_enabled_flag )~~ | |
| ~~pic_temporal_mvp_enabled_flag~~ | ~~u(1)~~ |
| ... ... | |
| } | |

In an alternative embodiment of Merge number signaling, the Merge number for regular Merge candidates is signaled in the SPS and the related syntax element is removed from the PPS. However, the related syntax element of the Merge number is still signaled in the PH.

| pic_parameter_set_rbsp( ) { | Descriptor |
|---|---|
| ... ... | |
| constant_slice_header_params_enabled_flag | u(1) |
| if( constant_slice_header_params_enabled_flag ) { | |
| ... ... | |
| | ~~ue(v)~~ |
| ~~pps_six_minus_max_num_merge_cand_plus1~~ | |
| ... ... | |
| } | |
| ... ... | |
| } | |

| picture_header_rbsp( ) { | Descriptor |
|---|---|
| ... ... | |
| if( !sps_six_minus_max_num_merge_cand_plus1 ) | |
| pic_six_minus_max_num_merge_cand | ue(v) |
| ... ... | |
| } | |

| seq_parameter_set_rbsp( ) { | Descriptor |
|---|---|
| ... ... | |
| sps_six_minus_max_num_merge_cand_plus1 | ue(v) |
| ... ... | |
| } | |

The syntax element sps_six_minus_max_num_merge_cand_plus1 with a value equal to 0 specifies the syntax element pic_six_minus_max_num_merge_cand is present in the picture headers referring to the SPS. The syntax element sps_six_minus_max_num_merge_cand_plus1 with a value greater than 0 specifies the syntax element pic_six_minus_max_num_merge_cand is not present in the picture headers referring to the SPS. The value of the syntax element sps_six_minus_max_num_merge_cand_plus1 shall be in the range of 0 to 6 inclusively.

In this embodiment, the Merge number signaling for the IBC Merge mode and the subblock Merge mode is exactly the same as the previous embodiment. Syntax elements associated with the Merge number of TPM Merge candidates are signaled in the SPS and the PH while the syntax element is removed from the PPS as shown in the following.

| pic_parameter_set_rbsp( ) { | Descriptor |
|---|---|
| ... ... | |
| constant_slice_header_params_enabled_flag | u(1) |
| if( constant_slice_header_params_enabled_flag | |
| ... ... | |
| | ~~ue(v)~~ |
| ~~pps_max_num_merge_cand_minus_max_num_triangle_cand_plus1~~ | |
| } | |
| ... ... | |
| } | |

| picture_header_rbsp( ) { | Descriptor |
|---|---|
| ... ... | |
| if( sps_triangle_enabled_flag && MaxNumMergeCand >= 2 && | |
| !sps_max_num_merge_cand_minus_max_num_triangle_cand_plus1 ) | |
| pic_max_num_merge_cand_minus_max_num_triangle_cand | ue(v) |
| ... ... | |
| } | |

| seq_parameter_set_rbsp( ) { | Descriptor |
|---|---|
| ... ... | |
|   if( sps_triangle_enabled_flag && MaxNumMergeCand >= 2 ) | |
|     sps_max_num_merge_cand_minus_max_num_triangle_cand_plus1 | ue (v) |
| ... ... | |
| } | |

The syntax element sps_max_num_merge_cand_minus_max_num_triangle_cand_plus1 with a value equal to 0 specifies the syntax element pic_max_num_merge_cand_minus_max_num_triangle_cand is present in picture headers of slices referring to the SPS. The syntax element sps_max_num_merge_cand_minus_max_num_triangle_cand_plus1 with a value greater than 0 specifies the syntax element pic_max_num_merge_cand_minus_max_num_triangle_cand is not present in picture headers referring to the SPS. The value of sps_max_num_merge_cand_minus_max_num_triangle_cand_plus1 shall be in the range of 0 to MaxNumMergeCand−1.

Embodiments of Signaling Merge Numbers

In one embodiment, the Merge numbers associated with the subblock Merge mode and the IBC Merge mode are signaled in the SPS instead of PH. In another embodiment, the Merge numbers associated with the regular Merge mode and the TPM Merge mode are signaled in the SPS instead of PPS.

Derivation of Merge Number from SPS Level Syntax

In one embodiment, a video encoder signals a SPS level syntax element to indicate a maximum Merge candidate number for all blocks in slices referring to the same SPS that are coded in the regular Merge mode. An example of the SPS level syntax element is sps_six_minus_max_number_merge_cand as shown in the following.

| sps_six_minus_max_num_merge_cand | ue(v) |
|---|---|

This syntax element specifies the maximum number of merging Motion Vector Prediction (MVP) candidates supported in the slices associated with the SPS subtracted from six. The Merge number for the regular Merge mode, MaxNumMergeCand, is derived by:

MaxNumMergeCand=6−sps_six_minus_max_num_merge_cand;

where the value of MaxNumMergeCand shall be in the range of 1 to 6, inclusively.

An embodiment of a video encoder signals a SPS level syntax element to indicate a maximum Merge candidate number for all blocks in slice referring to the same SPS that are coded in the IBC Merge mode. For example, the SPS level syntax element for the IBC Merge mode is sps_six_minu_max_num_ibc_merge_cand as shown in the following.

| if ( sps_ibc_enabled_flag ) | |
|---|---|
|   sps_six_minus_max_num_ibc_merge_cand | ue(v) |

This SPS level syntax element sps_six_minus_max_num_ibc_merge_cand specifies the maximum number of IBC merging Block Vector Prediction (BVP) candidates supported in the slices associated with the SPS subtracted from 6. The maximum number of IBC merging BVP candidates, MaxNumIbcMergeCand is derived by:

MaxNumIbcMergeCand=6−sps_six_minus_max_num_ibc_merge_cand;

where the value of MaxNumIbcMergeCand shall be in the range of 1 to 6, inclusively.

In an embodiment, a SPS level syntax element is signaled for the subblock Merge mode to indicate a maximum Merge candidate number for constructing a subblock Merge candidate list when a current block is coded by the subblock Merge mode. For example, the SPS level syntax element for the subblock Merge mode is sps_five_minus_max_num_subblock_merge_cand as shown in the following.

| if( sps_affine_enabled_flag ) | |
|---|---|
|   sps_five_minus_max_num_subblock_merge_cand | ue(v) |

The syntax element sps_five_minus_max_num_subblock_merge_cand specifies the maximum number of subblock based merging Motion Vector Prediction (MVP) candidates supported in the slice subtracted from 5. For each picture, if this syntax element is present, the maximum number of subblock based merging MVP candidates, MaxNumSubblockMergeCand, is derived as follows:

MaxNumSubblockMergeCand=5−sps_five_minus_max_num_subblock_merge_cand.

For each picture, if this syntax element sps_five_minus_max_num_subblock_merge_cand is not present, the maximum number of subblock-based merging MVP candidates, MaxNumSubblockMergeCand is derived by:

MaxNumSubblockMergeCand=5−(5−(sps_sbtmvp_enabled_flag && pic_temporal_mvp_enabled_flag));

where the value of MaxNumSubblockMergeCand shall be in the range of 0 to 5, inclusively. In another embodiment, pic_temporal_mvp_enabled_flag is cancelled in the picture header and only the SPS level sps_temporal_mvp_enabled_flag exists, the semantics of the new SPS level subblock Merge number will be slightly different from the above semantics, in which the value of sps_five_minus_max_num_ subblock_merge_cand is inferred to be equal to 5−(sps_sbtmvp_enabled_flag && sps_temporal_mvp_enabled_flag).

In an embodiment, a SPS level syntax element is signaled for blocks coded in the TPM Merge mode to indicate the number of maximum Merge candidate number. For example, the SPS level syntax element is sps_max_num_merge_cand_minus_max_num_triangle_cand specifies the maximum number of triangular Merge mode candidates supported in the slices associated with the SPS (i.e. MaxNumTriangleMergeCand) subtracted from the Merge number for the regular Merge mode (i.e. MaxNumMerge- Cand). The maximum number of triangular Merge mode candidates, MaxNumTriangleMergeCand is derived as:

MaxNumTriangleMergeCand=MaxNumMergeCand−sps_max_num_merge_cand_minus_max_num_triangle_cand;

where MaxNumMergeCand is the Merge number for the regular Merge mode. When sps_max_num_merge_cand_minus_max_num_triangle_cand is present, the value of MaxNumTriangleMergeCand shall be within the range of 2 to MaxNumMergeCand, inclusively. The syntax element sps_max_num_merge_cand_minus_max_num_triangle_cand is equal to 0 when MaxNumMergeCand is equal to 2 as the minimum value of MaxNumTriangleMergeCand is 2. When sps_max_num_merge_cand_minus_max_num_triangle_cand is not present and either sps_triangle_enabled_flag is equal to 0 or MaxNumMergeCand is less than 2, MaxNumTriangleMergeCand is set to 0. When MaxNumTriangleMergeCand is equal to 0, the TPM Merge mode is not allowed for the slices associated with the SPS. Accordingly, the syntax element sps_max_num_merge_cand_minus_max_num_triangle_cand may only be signaled when MaxNumMergeCand is greater than or equal to 3 since sps_max_num_merge_cand_minus_max_num_triangle_cand is inferred to be 0 when MaxNumMergeCand is less than or equal to 2.

The TPM Merge mode in this embodiment may be replaced by the GPM Merge mode. A SPS level syntax element sps_max_cand_minus_max_gpm_cand is signaled in the SPS to indicate a difference between the Merge number for the regular Merge mode MaxCand (or may be called as MaxNumMergeCand) and the Merge number for the GPM Merge mode MaxGpmCand (or may be called as MaxNumGpmMergeCand). The Merge number for the GPM Merge mode defines the size of a GPM Merge candidate list for each block coded in the GPM Merge mode. The maximum number of GPM Merge mode candidates MaxGpmCand is derived by:

MaxGpmCand=MaxCand−sps_max_cand_minus_max_gpm_cand.

When the syntax element sps_max_cand_minus_max_gpm_cand (or may be called as sps_max_num_merge_cand_minus_max_num_gpm_cand) is present, the value of MaxGpmCand shall be in the range of 2 to MaxCand, inclusively. When the syntax element sps_max_cand_minus_max_gpm_cand is not present and when either the SPS level GPM enabled flag is equal to 0 or MaxCand is less than 2, MaxGpmCand is set to 0, indicating the GPM Merge mode is not allowed for the slices associated with the SPS. When MaxCand is equal to 2, the syntax element sps_max_cand_minus_max_gpm_cand must be equal to 0 as the minimum value of MaxGpmCand is 2. Accordingly, the syntax element sps_max_cand_minus_ max_gpm_cand may only be signaled when MaxGpmCand is greater than or equal to 3 since sps_max_cand_minus_ max_gpm_cand is inferred to be 0 when MaxGpmCand is less than 3.

In another embodiment, when the syntax element sps_max_num_merge_cand_minus_max_num_triangle_cand is present, the value of MaxNumTriangleMergeCand shall be within the range of 2 to MaxNumMergeCand, inclusively. In cases when the syntax element sps_max_num_ merge_cand_minus_max_num_triangle_cand is not present and when either sps_triangle_enabled_flag is equal to 0 or MaxNumMergeCand is less than 2, the value of MaxNumTriangleMergeCand is set to 0. In cases when the value of MaxNumTriangleMergeCand is equal to or less than 1, the TPM Merge mode is not allowed for the slices associated with the picture header. That is MaxNumTriangleMergeCand has to be 2 when triangle Merge mode is used and MaxNumMergeCand is equal to 2, which implies the syntax element sps_max_num_merge_cand_minus_max_num_triangle_cand is inferred to be 0. In this embodiment, the syntax element sps_max_num_merge_cand_minus_max_num_triangle_cand may only be signaled when the value of MaxNumMergeCand is greater than 2 as MaxNumTriangleMergeCand is set to 0 when MaxNumMergeCand is less than 2 and MaxNumTriangleMergeCand is inferred to be 0 when MaxNumMergeCand is equal to 2.

In some embodiments of the present invention, the syntax element indicating a difference between a Merge number for the TPM or GPM Merge mode and a Merge number for the regular Merge mode is only signaled when the Merge number for the regular Merge mode is larger than or equal to a predefined value N, in which N is one fixed positive integer, for example, N=3. As described in the above embodiments, the difference between the Merge number for the TPM and the Merge number for the regular Merge mode is sps_max_num_merge_cand_minus_max_num_triangle_cand and the difference between the Merge number for the GPM Merge mode and the Merge number for the regular Merge mode is sps_max_cand_minus_max_gpm_cand (or may be called as sps_max_num_merge_cand_minus_max_num_gpm_cand). The syntax element indicating the difference between a Merge number for the TPM or GPM Merge mode and a Merge number for the regular Merge mode is inferred to be 0 when it is not signaled. In one embodiment, the syntax element indicating a difference between a Merge number for the TPM or GPM Merge mode and a Merge number for the regular Merge mode is signaled when both the SPS level TPM or GPM enable flag is equal to 1 and the Merge number for the regular Merge mode is larger than or equal to N. Blocks in slices referring to the SPS are allowed to be coded using TPM or GPM only when the SPS level TPM or GPM enable flag is equal to 1. An example of this embodiment is demonstrated in the following.

--- if( sps_triangle_enabled_flag && MaxNumMergeCand >= N)
    sps_max_num_merge_cand_minus_max_num_triangle_cand    ue(v)

---

In this embodiment, if the SPS level TPM enable flag sps_triangle_enabled_flag is equal to 0 or the Merge number for the regular Merge mode is less than N, the syntax element sps_max_num_merge_cand_minus_max_num_triangle_cand is not present and thus is inferred to be equal to 0.

In another embodiment, the syntax element sps_max_num_merge_cand_minus_max_num_triangle_cand is only signaled when the SPS level TPM enable flag is equal to 1 indicating TPM is enabled in the SPS. In this embodiment, when MaxNumTriangleMergeCand is less than or equal to 1, the TPM Merge mode is not allowed for the slices associated. Moreover, the signaling range of this syntax element sps_max_num_merge_cand_minus_max_num_triangle_cand is defined to ensure the formula derivation of MaxNumTriangleMergeCand=MaxNumMergeCand−sps_max_num_merge_cand_minus_max_num_triangle_cand will result in MaxNumTriangleMergeCand is less than or equal to Q, in which Q is equal to 0 in one embodiment and Q is equal to 1 in another embodiment.

Exemplary Flowcharts for Encoding or Decoding Process

Figure 9:
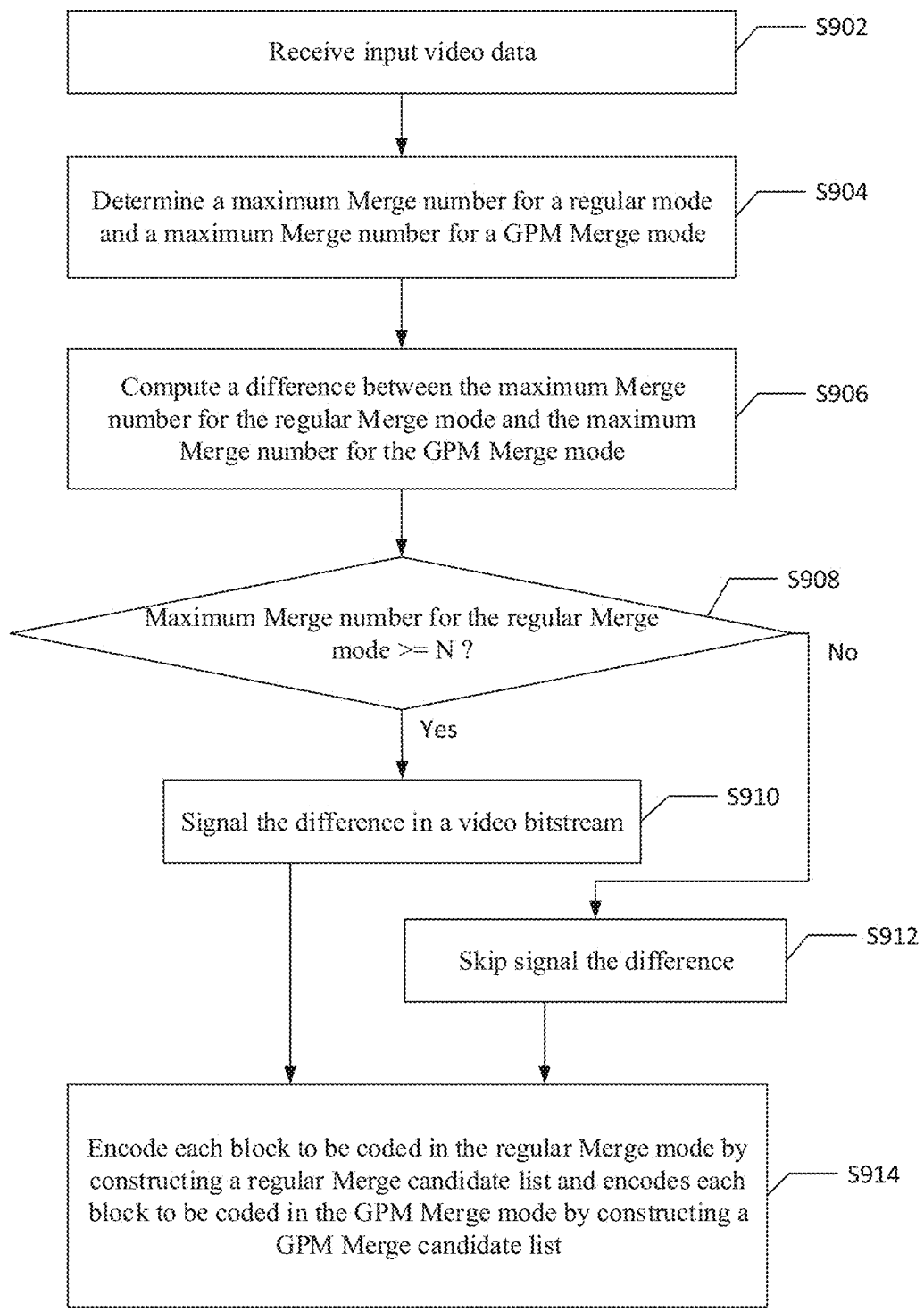
FIG. 9 is a flowchart illustrates an example of a video processing method implemented in a video encoding system according to an embodiment of the present invention.

FIG. 9 illustrates an exemplary flowchart of a video encoding system for processing blocks to be encoded by a regular Merge mode or GPM Merge mode and signaling Merge number information according to various embodiments of the present invention. The video encoding system receives input video data in Step S902, where the input video data corresponds to pixel data to be encoded into a video bitstream. In Step S904, a Merge number for a regular Merge mode and a Merge number for a GPM Merge mode are determined by the video encoding system. The video encoding system then computes a difference between the Merge number for the regular Merge mode and the Merge number for the GPM Merge mode by subtracting the Merge number for the GPM Merge mode from the Merge number for the regular Merge mode in step S906. In step S908, the Merge number for the regular Merge mode is compared with a predefined value N, and if the Merge number for the regular Merge mode is larger than or equal to N, the difference between the Merge number for the regular Merge mode and the Merge number for the GPM Merge mode is signaled in the video bitstream in step S910. Otherwise, the difference between the Merge number for the regular Merge mode and the Merge number for the GPM Merge mode is not signaled in step S912. In step S914, the video encoding system encodes each block to be coded in the regular Merge mode by constructing a regular Merge candidate list, and the video encoding system encodes each block to be coded in the GPM Merge mode by constructing a GPM Merge candidate list. The size of each regular Merge candidate list is equal to the Merge number for the regular Merge mode and the size of each GPM Merge candidate list is equal to the Merge number for the GPM Merge mode.

Figure 10:
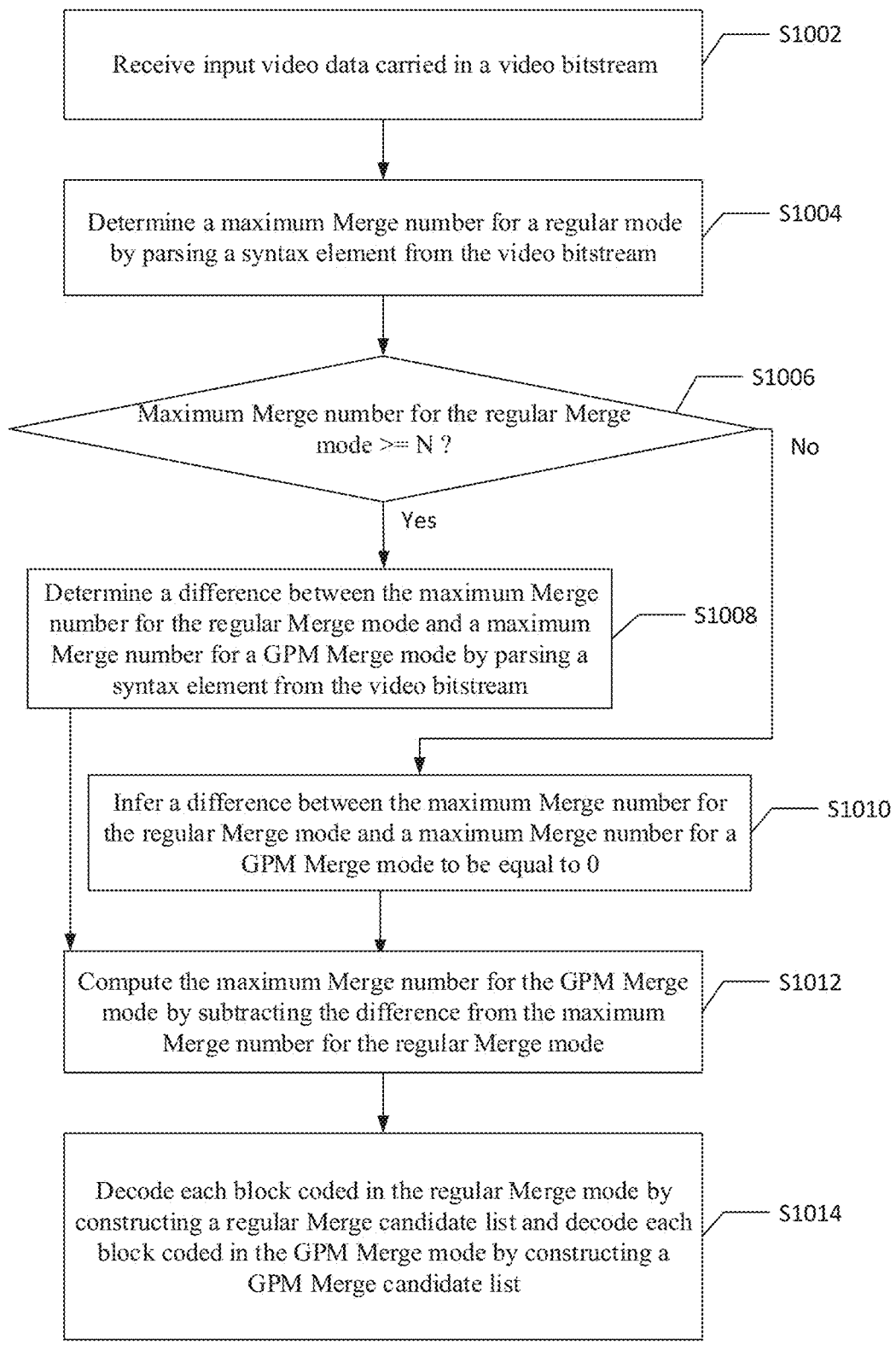
FIG. 10 is a flowchart illustrates an example of a video processing method implemented in a video decoding system according to an embodiment of the present invention.

FIG. 10 illustrates an exemplary flowchart of a video decoding system for processing blocks coded by a regular Merge mode or GPM Merge mode according to various embodiments of the present invention. The video decoding system receives input video data in a video bitstream in Step S1002, where the input data corresponds to coded data or prediction residual in the video bitstream to be decoded by the video decoding system. A Merge number for a regular Merge mode is determined by parsing a syntax element from the video bitstream in step S1004, and compared with a predefined value N in step S1006. In cases when the Merge number for the regular Merge mode is larger than or equal to N, a difference between the Merge number for the regular Merge mode and a Merge number for a GPM Merge mode is determined by parsing a syntax element from the video bitstream in step S1008. In cases when the Merge number for the regular Merge mode is less than N, a difference between the Merge number for the regular Merge mode and the Merge number for the GPM Merge mode is inferred to be equal to 0 in step S1010. The video decoding system computes the Merge number for the GPM Merge mode by subtracting the difference from the Merge number for the regular Merge mode in step S1012. In step S1014, the video decoding system decodes each block coded by the regular Merge mode by constructing a regular Merge candidate list and decodes each block coded by the GPM Merge mode by constructing a GPM Merge candidate list. The size of each regular Merge candidate list is equal to the Merge number for the regular Merge mode and the size of each GPM Merge candidate list is equal to the Merge number for the GPM Merge mode.

Video Encoder and Decoder Implementations

Figure 11:
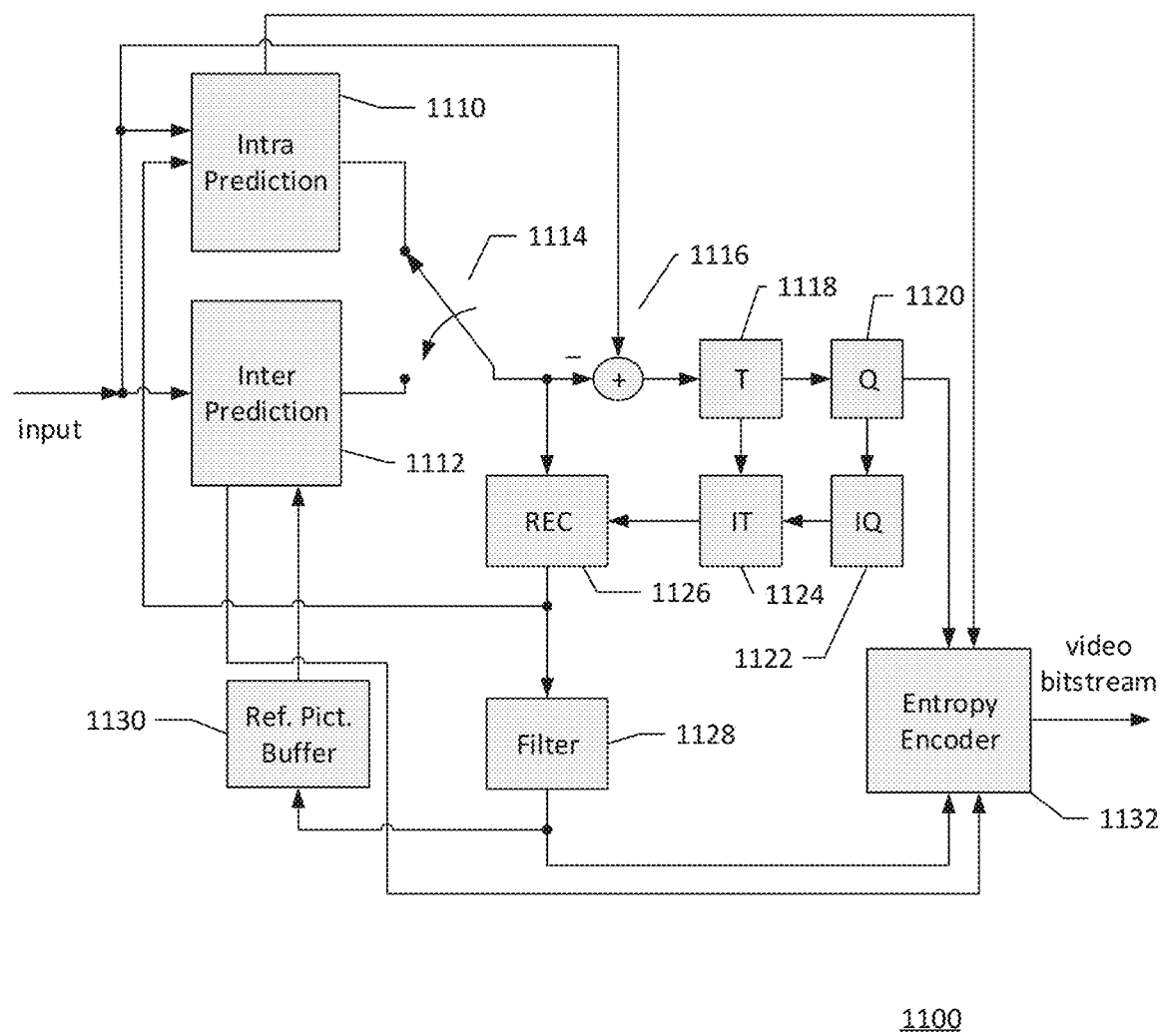
FIG. 11 illustrates an exemplary system block diagram for a video encoding system incorporating the video processing method according to embodiments of the present invention.

The foregoing proposed video processing methods can be implemented in video encoders or decoders. For example, a proposed video processing method is implemented in an inter prediction module of an encoder, alternatively, any of the proposed methods is implemented as a circuit coupled to the inter prediction module of the encoder and/or the inter prediction module of the decoder, so as to provide the information needed by the inter prediction module. FIG. 11 illustrates an exemplary system block diagram for a Video Encoder 1100 implementing one of various embodiments of the present invention. An Intra Prediction module 1110 provides intra predictors based on reconstructed video data of a current picture. An Inter Prediction module 1112 performs Motion Estimation (ME) and Motion Compensation (MC) to provide inter predictors based on video data from other picture or pictures. The Inter Prediction module 1112 determines a Merge number for a regular Merge mode and a Merge number for a GPM Merge mode, and computes a difference between the Merge number for the regular Merge mode and the Merge number for the GPM Merge mode. The Inter Prediction module 1112 generates a predictor for a current block by constructing a regular Merge candidate list when the current block is to be encoded by the regular Merge mode or the Inter Prediction module 1112 generates a predictor for a current block by constructing a GPM Merge candidate list when the current block is to be encoded by the GPM Merge mode. The number of candidates in the regular Merge candidate list is defined by the Merge number for the regular Merge mode and the number of candidates in the GPM Merge candidate list is defined by the Merge number for the GPM Merge mode. The difference between the two Merge numbers is only signaled in a video bitstream if the Merge number for the regular Merge mode is larger than or equal to a predefined value N, for example N is equal to 3. Either the Intra Prediction module 1110 or Inter Prediction module 1112 supplies a selected predictor to an Adder module 1116 to form prediction errors for the current block, also called prediction residual. The prediction residual of the current block are further processed by a Transformation (T) module 1118 followed by a Quantization (Q) module 1120. The transformed and quantized residual signal is then encoded by an Entropy Encoder 1132 to form the video bitstream. The video bitstream is then packed with side information such as the Merge number for the regular Merge mode and the difference between the Merge number for the regular Merge mode and the Merge number for the GPM Merge mode. The transformed and quantized residual signal of the current block is then processed by an Inverse Quantization (IQ) module 1122 and an Inverse Transformation (IT) module 1124 to recover the prediction residual. As shown in FIG. 11, the prediction residual is recovered by adding back to the selected predictor at a Reconstruction (REC) module 1126 to produce reconstructed video data. The reconstructed video data may be stored in a Reference Picture Buffer (Ref. Pict. Buffer) 1130 and used for prediction of other pictures. The reconstructed video data recovered from the REC module 1126 may be subject to various impairments due to encoding processing; consequently, an In-loop Processing Filter 1128 is applied to the reconstructed video data before storing in the Reference Picture Buffer 1130 to further enhance picture quality.

Figure 12:
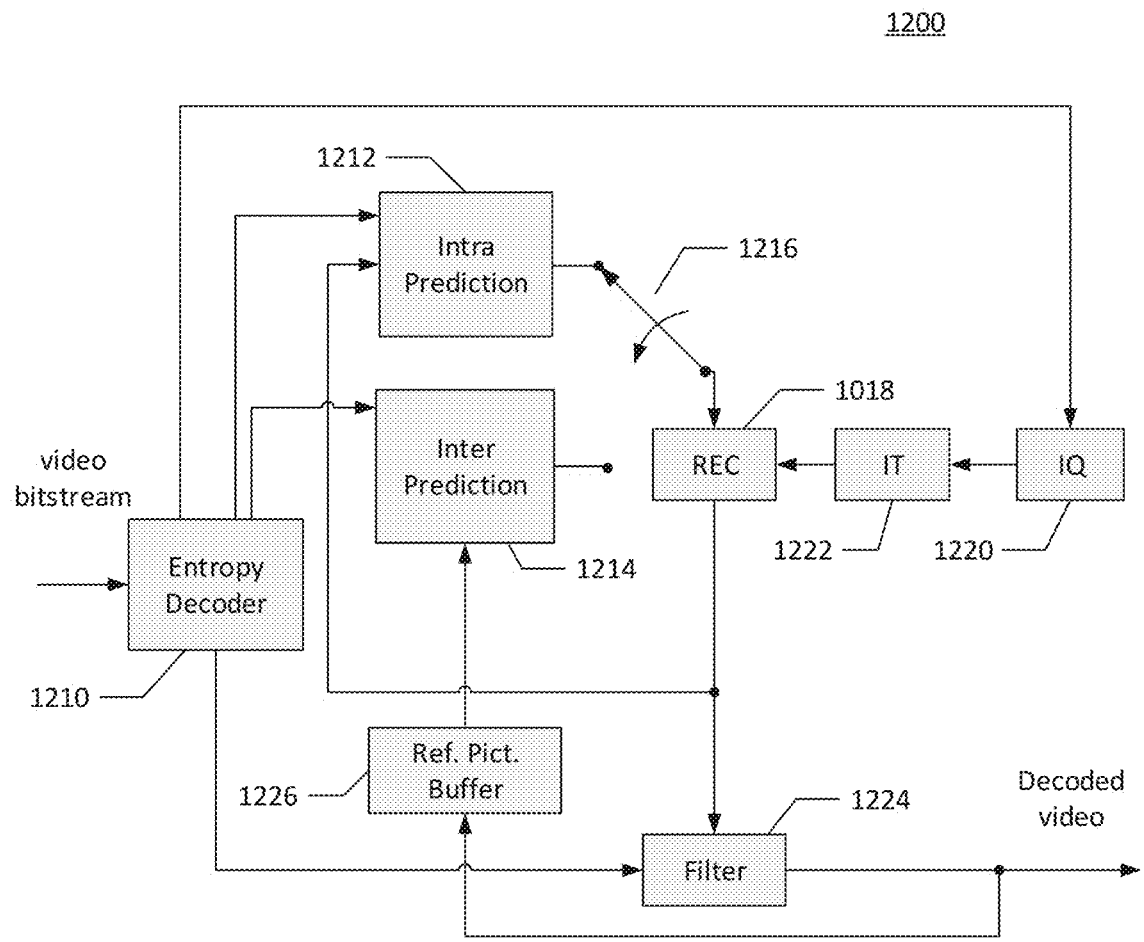
FIG. 12 illustrates an exemplary system block diagram for a video decoding system incorporating the video processing method according to embodiments of the present invention.

A corresponding Video Decoder 1200 for decoding the video bitstream generated from the Video Encoder 1100 of FIG. 11 is shown in FIG. 12. The video bitstream is the input to the Video Decoder 1200 and is decoded by the Entropy Decoder 1210 to parse and recover the transformed and quantized residual signal and other system information. The decoding process of the Video Decoder 1200 is similar to the reconstruction loop at the Video Encoder 1100, except the Video Decoder 1200 only requires motion compensation prediction in the Inter Prediction module 1214. Each block is decoded by either the Intra Prediction module 1212 or Inter Prediction module 1214. A Switch module 1216 selects an intra predictor from the Intra Prediction module 1212 or an inter predictor from the Inter Prediction module 1214 according to decoded mode information. The Inter Prediction module 1214 performs motion compensation by constructing a regular Merge candidate list when a current block is coded by a regular Merge mode or the Inter Prediction module 1214 performs motion compensation by constructing a GPM Merge candidate list when a current block is coded by a GPM Merge mode. A number of candidates in the GPM Merge candidate list is defined by a Merge number for the GPM Merge mode. According to some embodiments, the Inter Prediction module 1214 compares a Merge number for the regular Merge mode with a predefined value N and parses a syntax element related to a difference between the Merge number for the regular Merge mode and the Merge number for the GPM Merge mode from the video bitstream only if the Merge number for the regular Merge mode is larger than or equal to the predefined value N. Otherwise the difference between the Merge numbers is inferred to be equal to 0. For example, the syntax element related to the difference is signaled in a SPS. The Merge number for the GPM Merge mode is computed by subtracting the difference between the Merge numbers from the Merge number for the regular Merge mode. The transformed and quantized residual signal associated with each block is recovered by an Inverse Quantization (IQ) module 1220 and an Inverse Transformation (IT) module 1222. The recovered residual signal is reconstructed by adding back the predictor in a Reconstruction (REC) module 1218 to produce reconstructed video. The reconstructed video is further processed by an In-loop Processing Filter (Filter) 1224 to generate final decoded video. If the currently decoded picture is a reference picture for later pictures in a decoding order, the reconstructed video of the currently decoded picture is also stored in the Ref. Pict. Buffer 1226.

Various components of the Video Encoder 1100 and the Video Decoder 1200 in FIG. 11 and FIG. 12 may be implemented by hardware components, one or more processors configured to execute program instructions stored in a memory, or a combination of hardware and processor. For example, a processor executes program instructions to control signaling or parsing a difference between Merge numbers by comparing a Merge number for the regular Merge mode and a predefined value N. The processor is equipped with a single or multiple processing cores. In some examples, the processor executes program instructions to perform functions in some components in the Encoder 1100 and Decoder 1200, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 11 and 12, the Encoder 1100 and Decoder 1200 may be implemented in the same electronic device, so various functional components of the Encoder 1100 and Decoder 1200 may be shared or reused if implemented in the same electronic device.

Embodiments of the video processing method for encoding or decoding may be implemented in a circuit integrated into a video compression chip or program codes integrated into video compression software to perform the processing described above. For examples, comparing the Merge number for the regular Merge mode with a predefined value may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method in a video encoding system, comprising:

receiving input video data;

determining a Merge number for a regular Merge mode and a Merge number for a Geometric Partition Mode (GPM) Merge mode, wherein the Merge number for the regular Merge mode defines a number of candidates included in each regular Merge candidate list and the Merge number for the GPM Merge mode defines a number of candidates included in each GPM Merge candidate list;

computing a difference between the Merge number for the regular Merge mode and the Merge number for the GPM Merge mode by subtracting the Merge number for the GPM Merge mode from the Merge number for the regular Merge mode;

comparing the Merge number for the regular Merge mode with a predefined value, wherein the predefined value is a positive integer;

signaling the difference between the Merge number for the regular Merge mode and the Merge number for the GPM Merge mode in a video bitstream carrying encoded video data if the Merge number for the regular Merge mode is larger than or equal to the predefined value; and encoding each block to be coded in the regular Merge mode by constructing a regular Merge candidate list and encoding each block to be coded in the GPM Merge mode by constructing a GPM Merge candidate list.

2. The method of claim 1, further comprising signaling a syntax element related to the Merge number for the regular Merge mode at a same level as signaling a syntax element related to the difference between the Merge number for the regular Merge mode and the Merge number for the GPM Merge mode.

3. The method of claim 2, further comprising signaling syntax elements related to Merge numbers for an Intra Block Copy (IBC) Merge mode and a subblock Merge mode at the same level as signaling the syntax element related to the Merge numbers for the regular Merge mode and the GPM Merge mode.

4. The method of claim 2, wherein the same level is a sequence level, and the syntax element related to the Merge number for the regular Merge mode and the syntax element related to the difference between the Merge number for the regular Merge mode and the Merge number for the GPM Merge mode are signaled in a Sequence Parameter Set (SPS).

5. The method of claim 2, wherein the same level is a picture level, and the syntax element related to the Merge number for the regular Merge mode and the syntax element related to the difference between the Merge number for the regular Merge mode and the Merge number for the GPM Merge mode are signaled in a Picture Parameter Set (PPS).

6. The method of claim 1, wherein a value of the Merge number for the regular Merge mode is restricted within a range of 1 to 6, inclusively.

7. The method of claim 1, wherein a value of the Merge number for the GPM Merge mode is restricted within a range of 2 to the Merge number for the regular Merge mode, inclusively.

8. The method of claim 1, wherein the Merge number for the GPM Merge mode is set to 0 when the Merge number for the regular Merge mode is less than the predefined value, indicating the GPM merge mode is not allowed.

9. The method of claim 1, wherein the predefined value is 3.

10. A video processing method in a video decoding system, comprising:
receiving input video data in a video bitstream;
determining a Merge number for a regular Merge mode by parsing a syntax element signaled in the video bitstream, wherein the Merge number for the regular Merge mode defines a number of candidates included in each regular Merge candidate list;
comparing the Merge number for the regular Merge mode with a predefined value, wherein the predefined value is a positive integer;
determining a difference between the Merge number for the regular Merge mode and a Merge number for a Geometric Partition Mode (GPM) Merge mode by parsing a syntax element signaled in the video bitstream if the Merge number for the regular Merge mode is larger than or equal to the predefined value, or inferring the difference between the Merge number for the regular Merge mode and the Merge number for the GPM Merge mode to be 0 if the Merge number for the regular Merge mode is less than the predefined value;
computing the Merge number for the GPM Merge mode by subtracting the difference between the Merge number for the regular Merge mode and the Merge number for the GPM Merge mode from the Merge number for the regular Merge mode, wherein the Merge number for the GPM Merge mode defines a number of candidates included in each GPM Merge candidate list; and
decoding each block coded in the regular Merge mode by constructing a regular Merge candidate list and decoding each block coded in the GPM Merge mode by constructing a GPM Merge candidate list.

11. The method of claim 10, wherein the syntax element related to the difference is parsed from a same level as parsing the syntax element related to the Merge number for the regular Merge mode.

12. The method of claim 11, further comprising parsing syntax elements related to Merge numbers for an Intra Block Copy (IBC) Merge mode and a subblock Merge mode at the same level as parsing the syntax elements related to the Merge numbers for the regular Merge mode and the GPM Merge mode.

13. The method of claim 11, wherein the same level is a sequence level, and the syntax element related to the Merge number for the regular Merge mode and the syntax element related to the difference between the Merge number for the regular Merge mode and the Merge number for the GPM Merge mode are signaled in a Sequence Parameter Set (SPS).

14. The method of claim 11, wherein the same level is a picture level, and the syntax element related to the Merge number for the regular Merge mode and the syntax element related to the difference between the Merge number for the regular Merge mode and the Merge number for the GPM Merge mode are signaled in a Picture Parameter Set (PPS).

15. The method of claim 10, wherein a value of the Merge number for the regular Merge mode is restricted to be within a range of 1 to 6, inclusively.

16. The method of claim 10, wherein a value of the Merge number for the GPM Merge mode is restricted within a range of 2 to the Merge number for the regular Merge mode, inclusively.

17. The method of claim 10, wherein the step of inferring the Merge number for the GPM Merge mode to be equal to 0 indicates the GPM Merge mode is not allowed.

18. The method of claim 10, wherein the predefined value is 3.

19. An apparatus of processing video data in a video encoding system, the apparatus comprising one or more electronic circuits configured for:
receiving input video data;
determining a Merge number for a regular Merge mode and a Merge number for a Geometric Partition Mode (GPM) Merge mode, wherein the Merge number for the regular Merge mode defines a number of candidates included in each regular Merge candidate list and the Merge number for the GPM Merge mode defines a number of candidates included in each GPM Merge candidate list;
computing a difference between the Merge number for the regular Merge mode and the Merge number for the GPM Merge mode by subtracting the Merge number for the GPM Merge mode from the Merge number for the regular Merge mode;
comparing the Merge number for the regular Merge mode with a predefined value, wherein the predefined value is a positive integer;
signaling the difference between the Merge number for the regular Merge mode and the Merge number for the GPM Merge mode in a video bitstream carrying encoded video data if the Merge number for the regular Merge mode is larger than or equal to the predefined value; and
encoding each block to be coded in the regular Merge mode by constructing a regular Merge candidate list and encoding each block to be coded in the GPM Merge mode by constructing a GPM Merge candidate list.

20. An apparatus of processing video data in a video encoding system, the apparatus comprising one or more electronic circuits configured for:
receiving input video data in a video bitstream;
determining a Merge number for a regular Merge mode by parsing a syntax element signaled in the video bitstream, wherein the Merge number for the regular Merge mode defines a number of candidates included in each regular Merge candidate list;
comparing the Merge number for the regular Merge mode with a predefined value, wherein the predefined value is a positive integer;
determining a difference between the Merge number for the regular Merge mode and a Merge number for a Geometric Partition Mode (GPM) Merge mode by parsing a syntax element signaled in the video bitstream if the Merge number for the regular Merge mode is larger than or equal to the predefined value, or inferring the difference between the Merge number for the regular Merge mode and the Merge number for the GPM Merge mode to be 0 if the Merge number for the regular Merge mode is less than the predefined value;
computing the Merge number for the GPM Merge mode by subtracting the difference between the Merge number for the regular Merge mode and the Merge number for the GPM Merge mode from the Merge number for the regular Merge mode, wherein the Merge number for the GPM Merge mode defines a number of candidates included in each GPM Merge candidate list; and
decoding each block coded in the regular Merge mode by constructing a regular Merge candidate list and decoding each block coded in the GPM Merge mode by constructing a GPM Merge candidate list.

* * * * *